May 18, 1937. H. E. PRESTON 2,081,067
STOKER
Original Filed March 22, 1923 24 Sheets-Sheet 1

Inventor:-
Herbert E. Preston,
by his Attorneys,
Howson & Howson

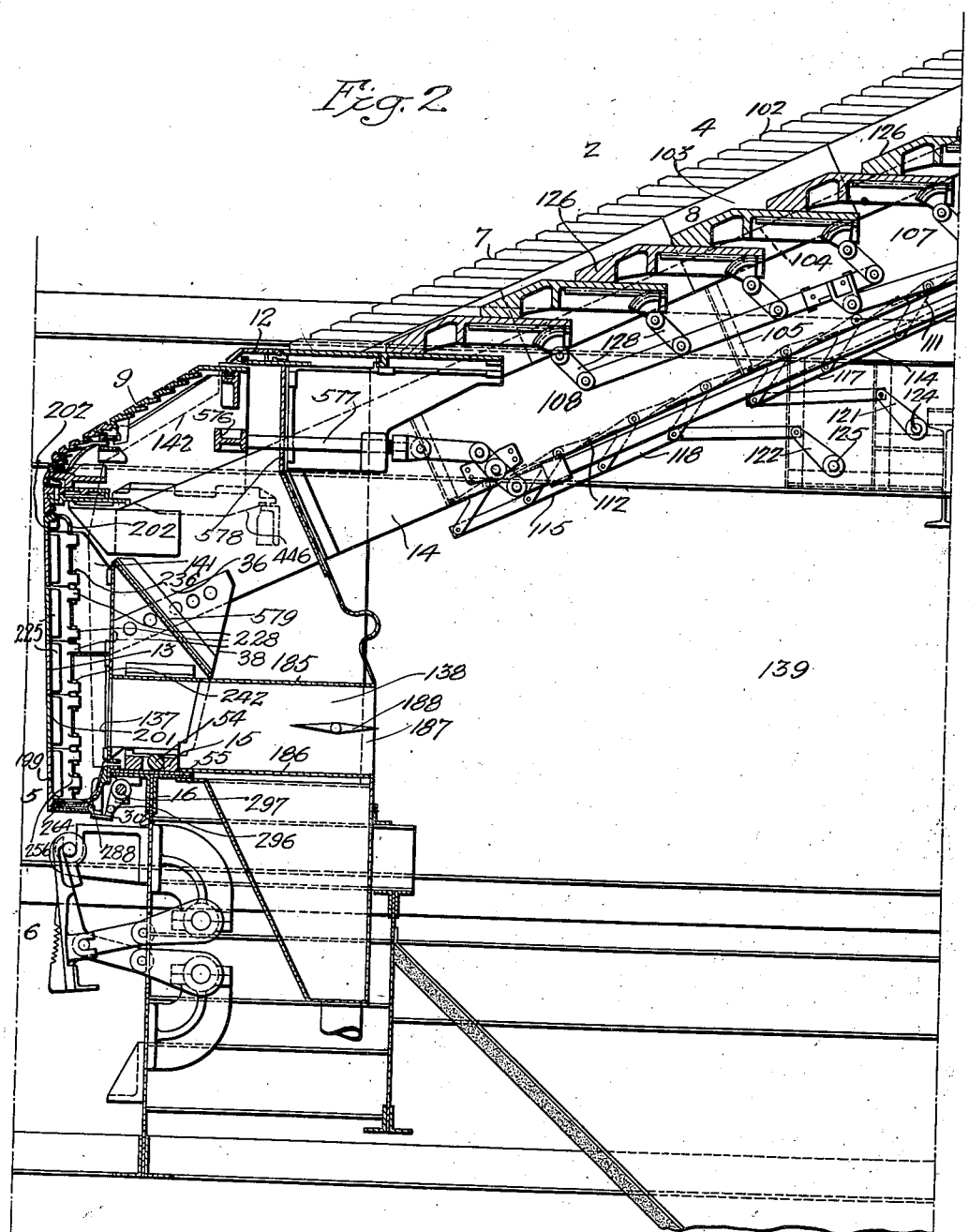

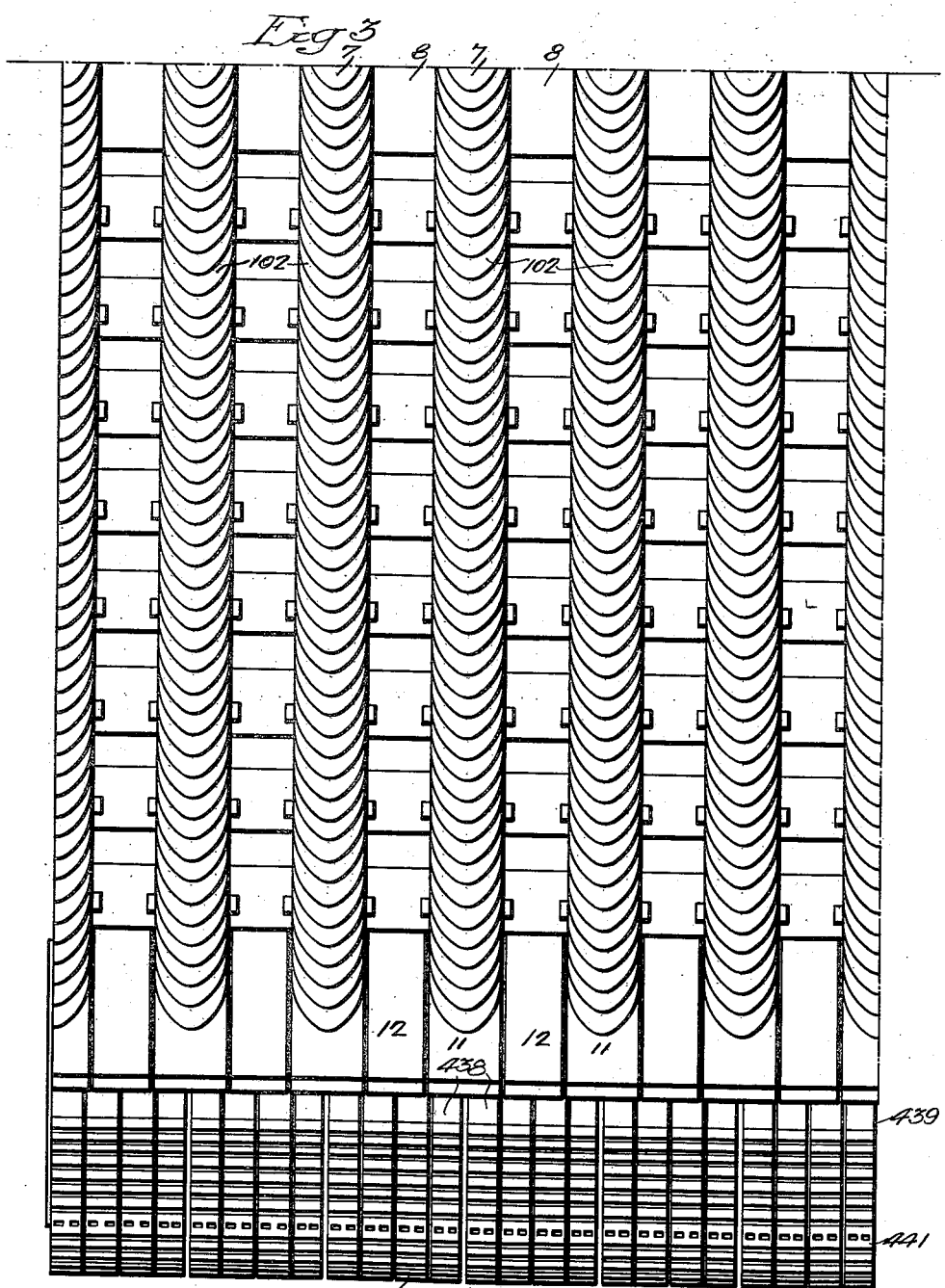

May 18, 1937.  H. E. PRESTON  2,081,067
STOKER
Original Filed March 22, 1928  24 Sheets-Sheet 4
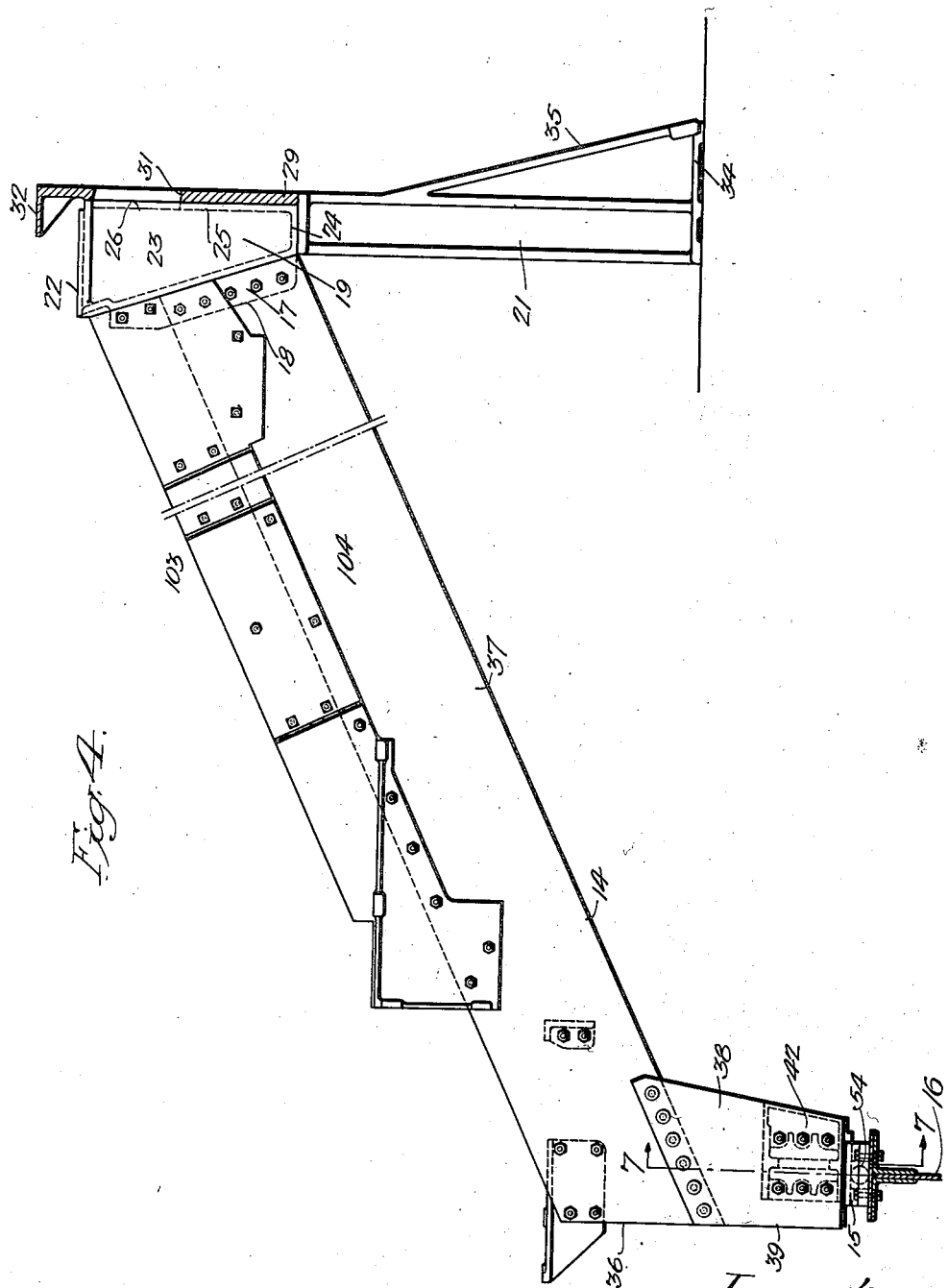

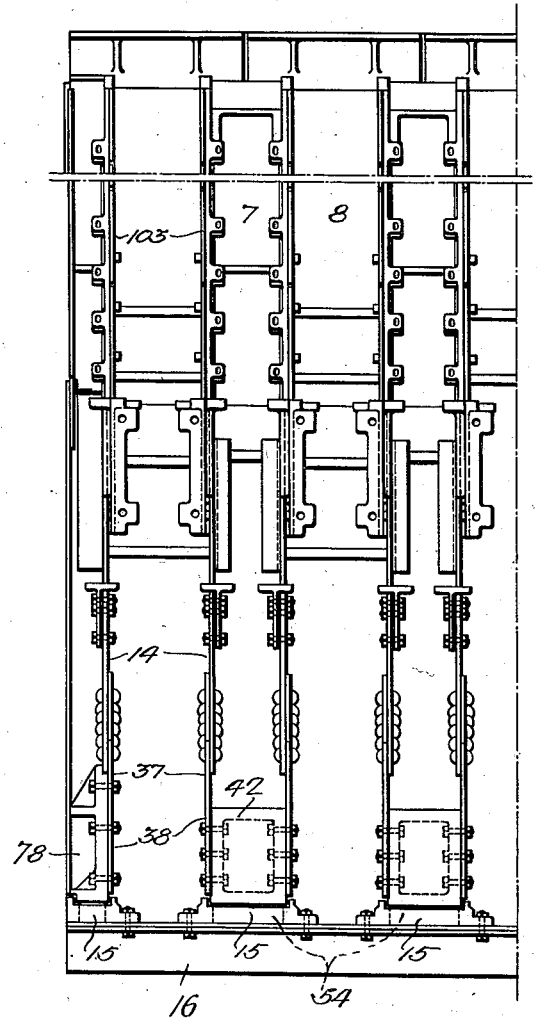

May 18, 1937. H. E. PRESTON 2,081,067
STOKER
Original Filed March 22, 1928 24 Sheets-Sheet 6
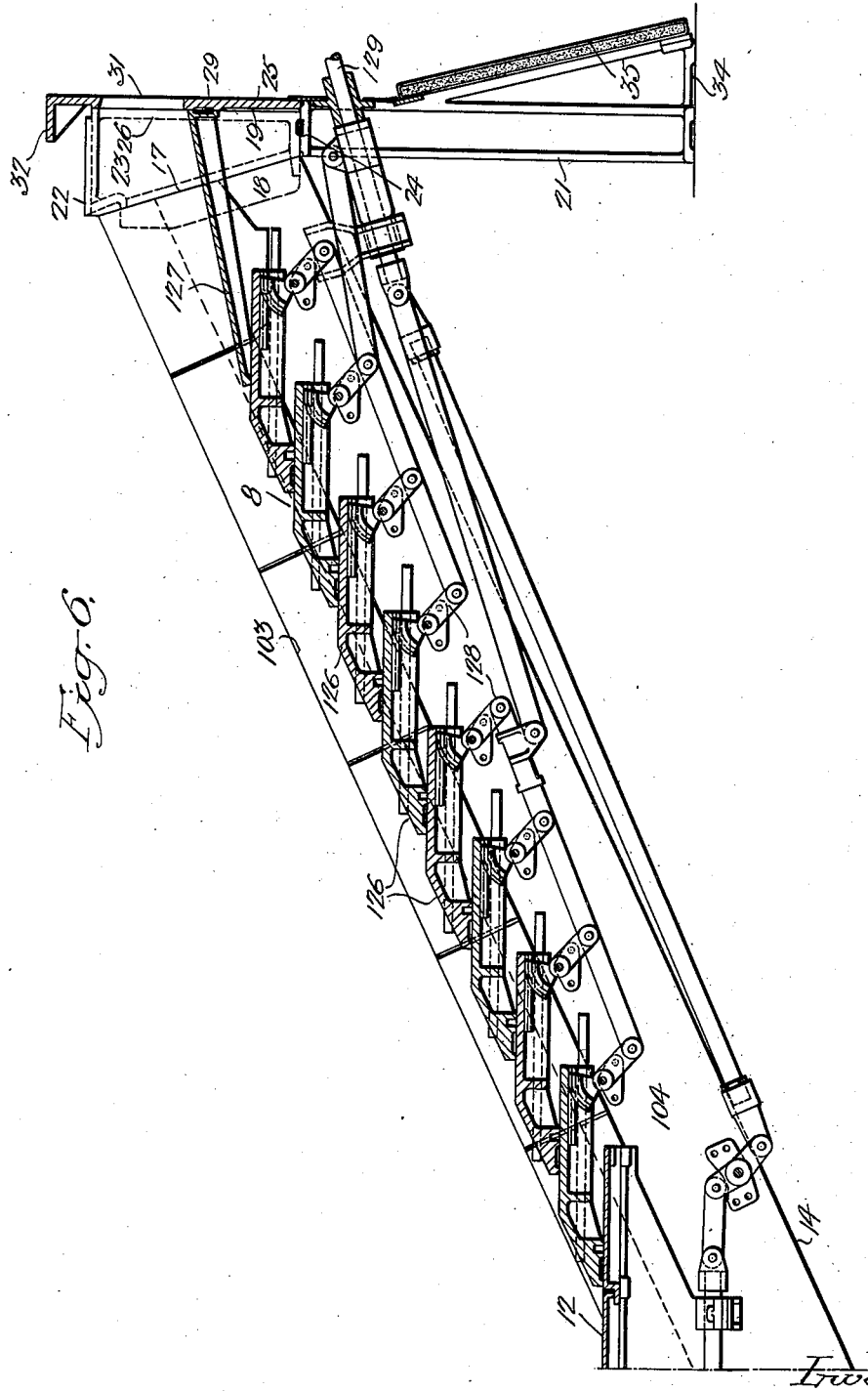

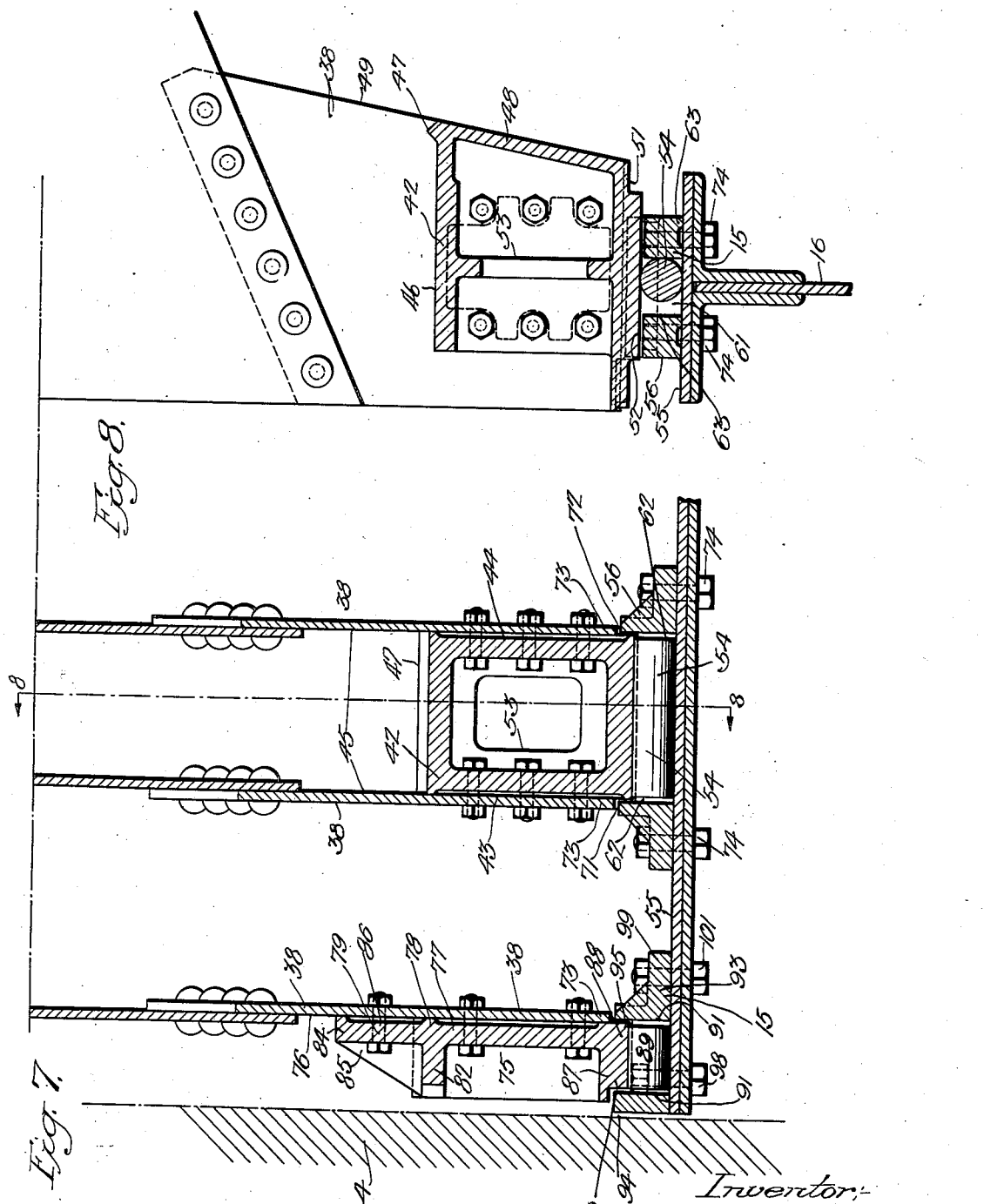

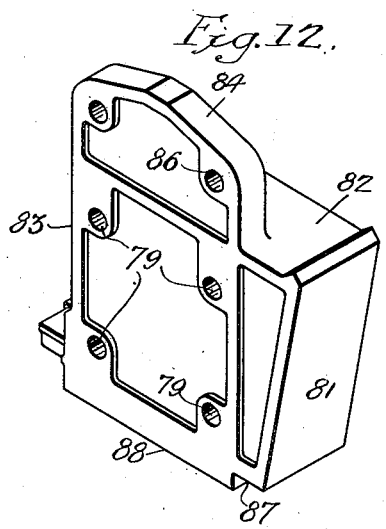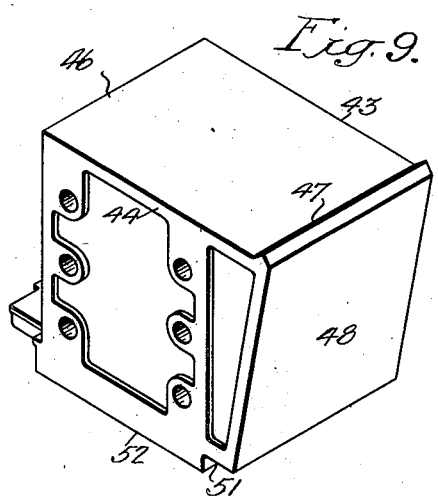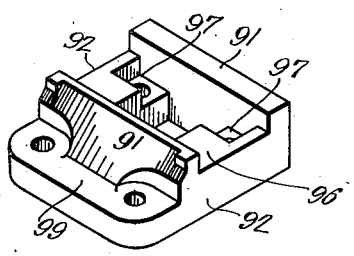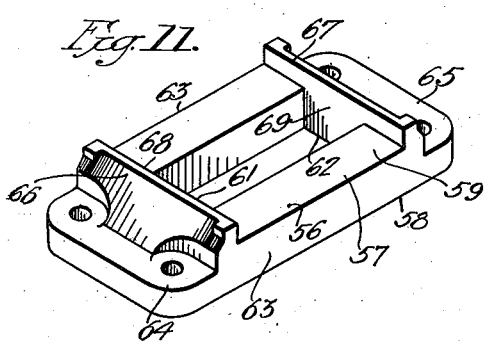

May 18, 1937.  H. E. PRESTON  2,081,067
STOKER
Original Filed March 22, 1928   24 Sheets-Sheet 9

Inventor:-
Herbert E. Preston
by his Attorneys.
Howson & Howson

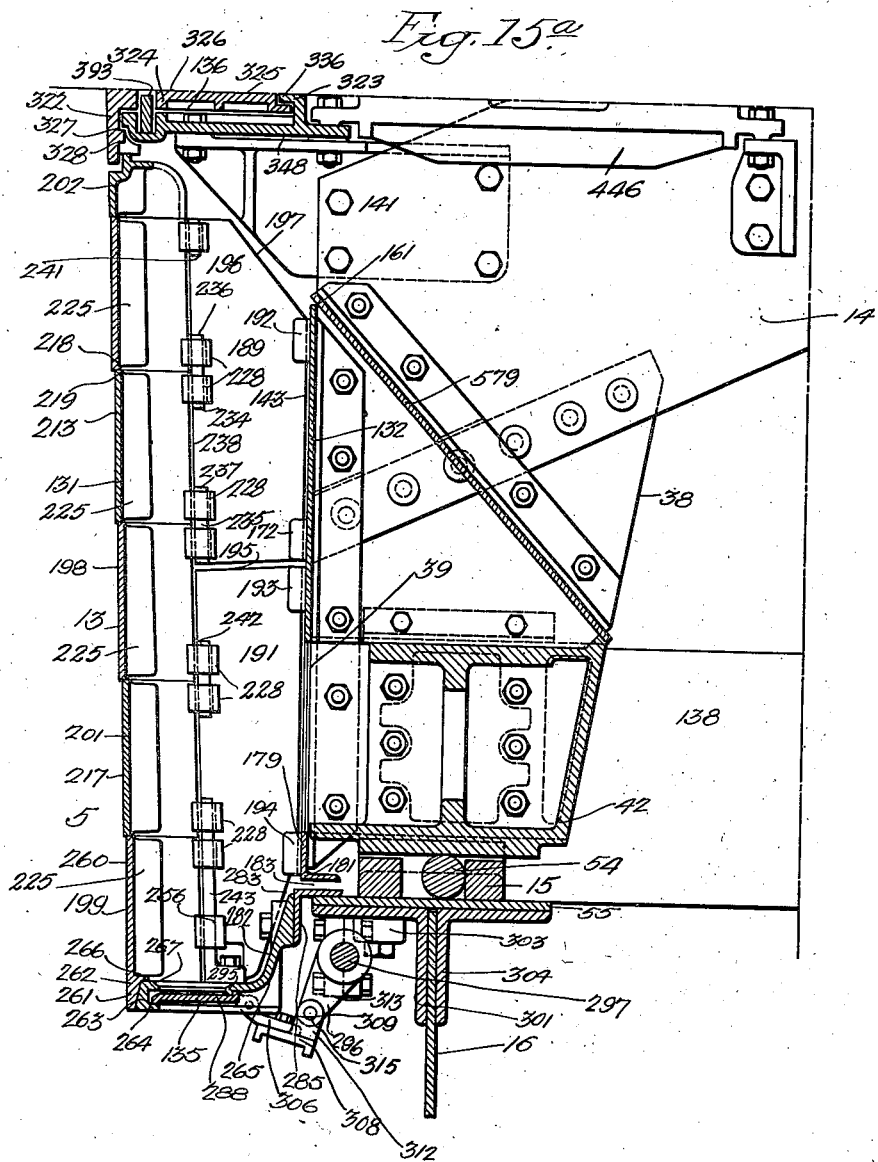

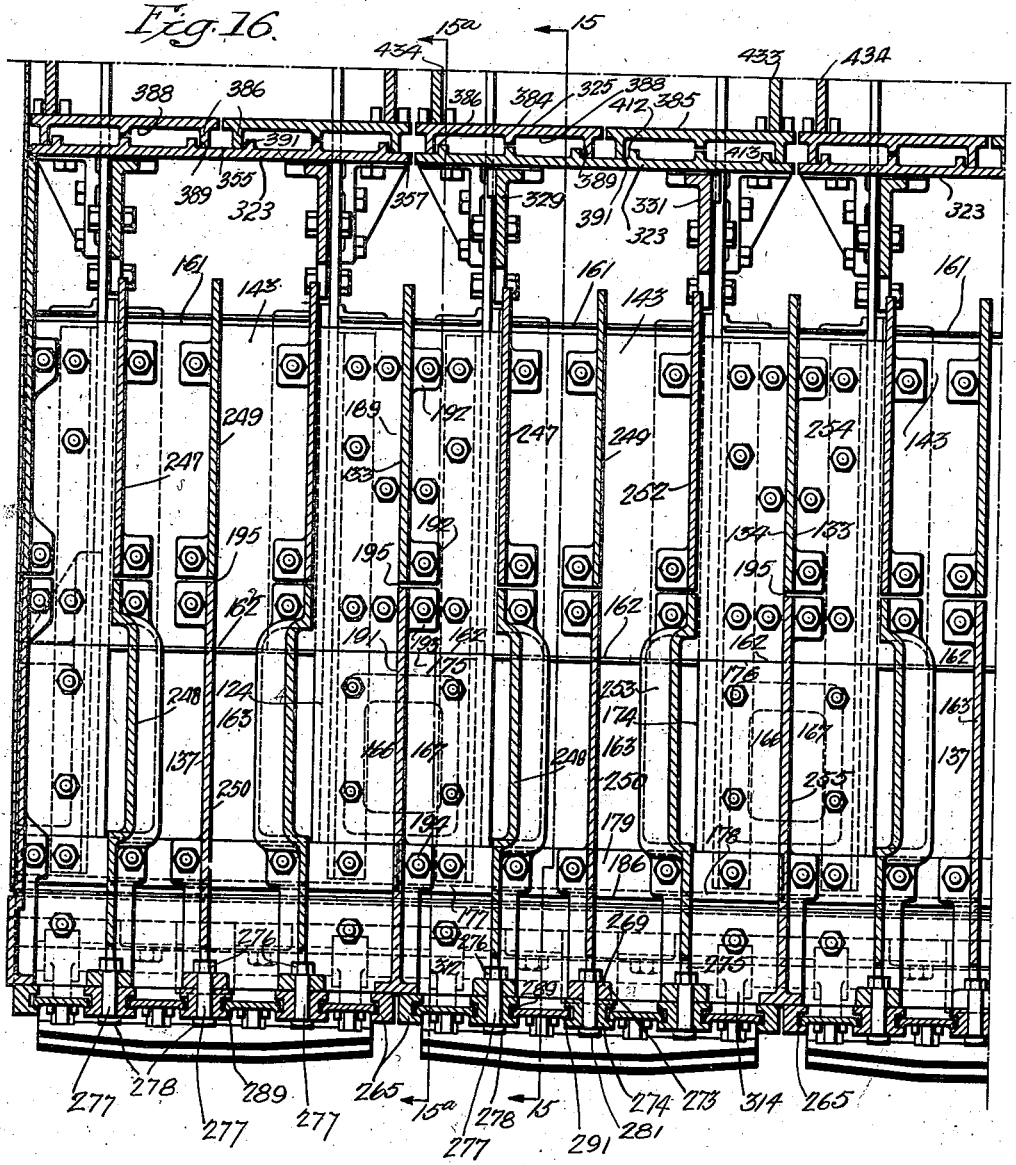

May 18, 1937. H. E. PRESTON 2,081,067
STOKER
Original Filed March 22, 1928 24 Sheets-Sheet 12
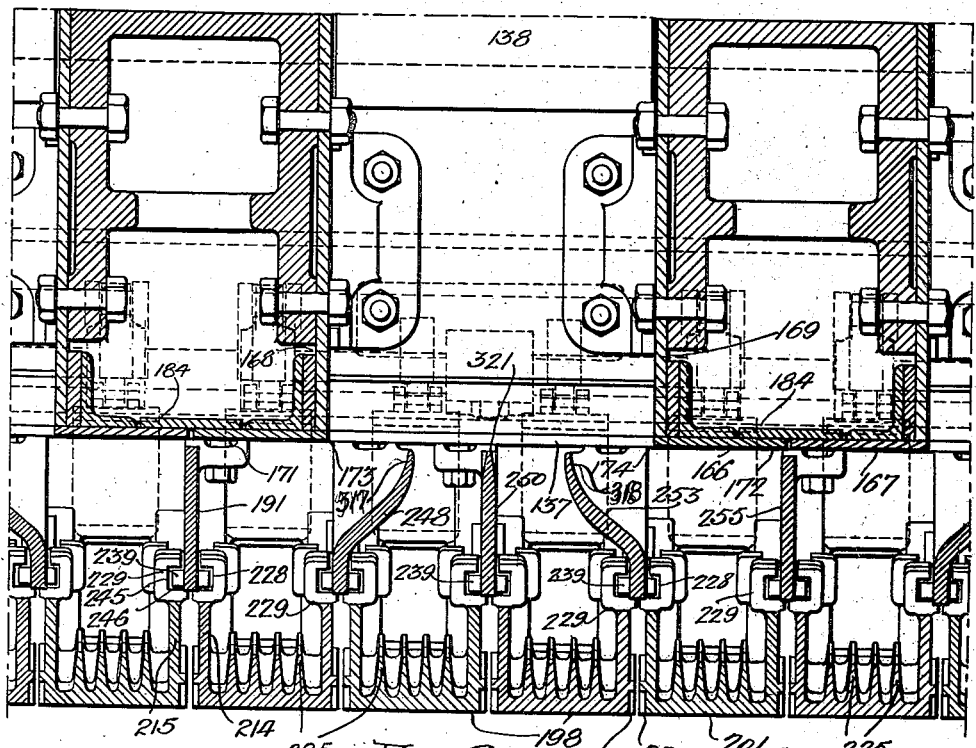
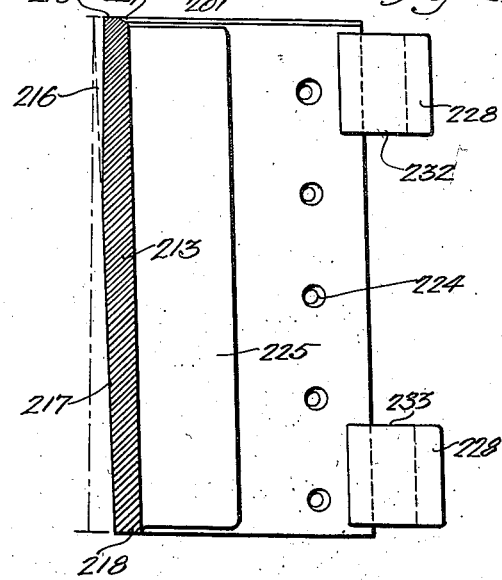
Inventor:—
Herbert E. Preston,
by his Attorneys,
Howson & Howson May 18, 1937. H. E. PRESTON 2,081,067
STOKER
Original Filed March 22, 1928 24 Sheets-Sheet 13
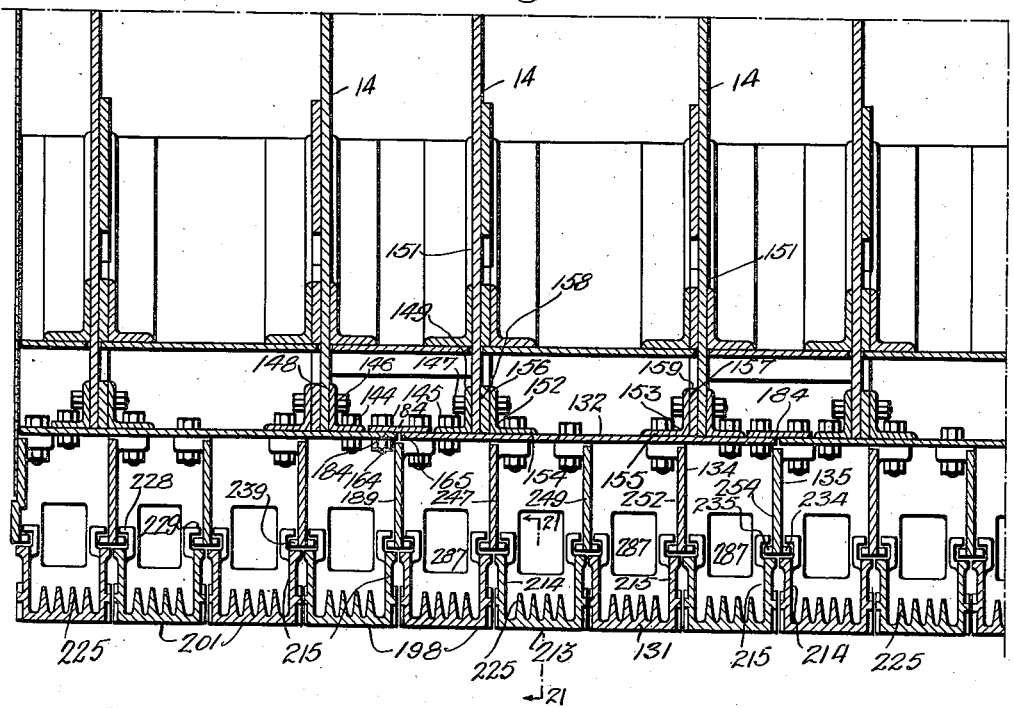
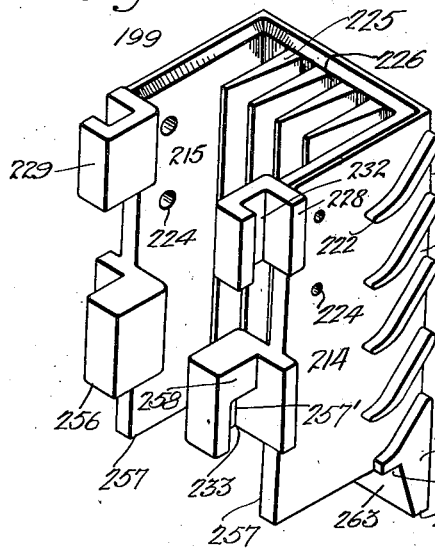
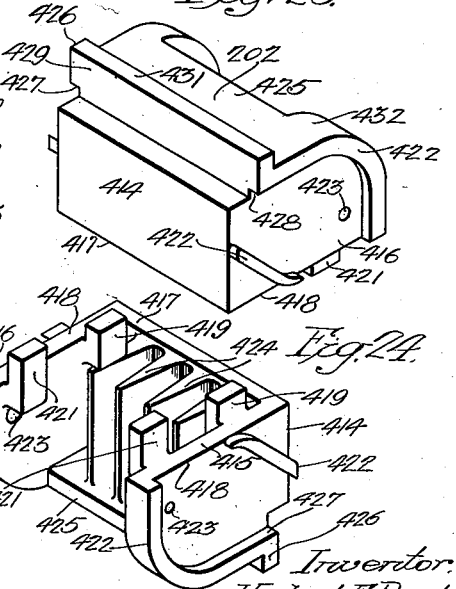

May 18, 1937. H. E. PRESTON 2,081,067
STOKER
Original Filed March 22, 1928 24 Sheets-Sheet 14
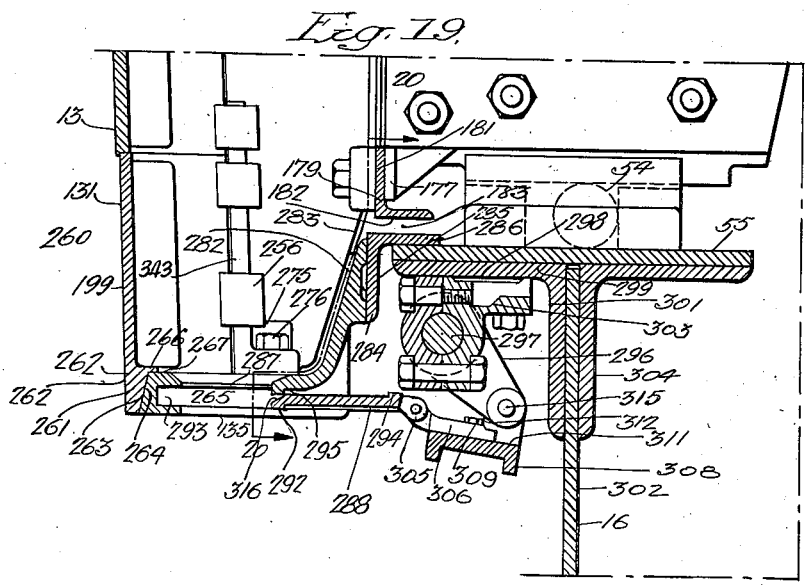
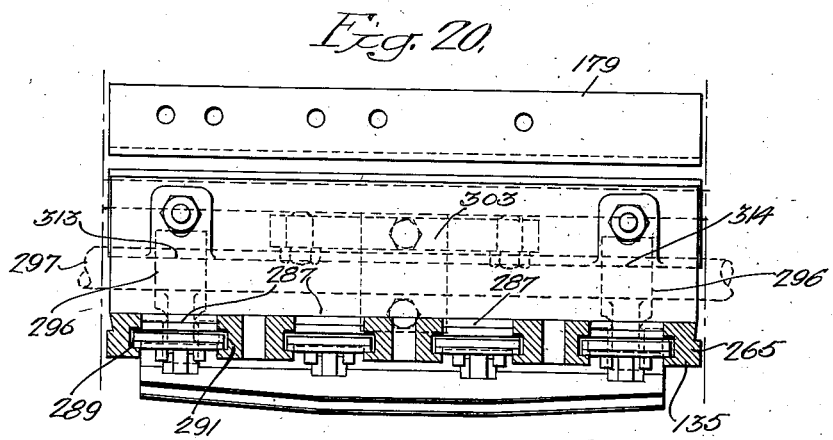
Inventor:-
Herbert E. Preston,
by his Attorneys,
Howson & Howson May 18, 1937. H. E. PRESTON 2,081,067
STOKER
Original Filed March 22, 1928 24 Sheets—Sheet 15
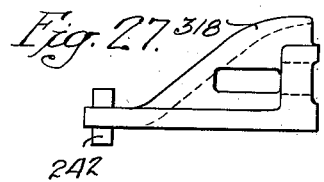
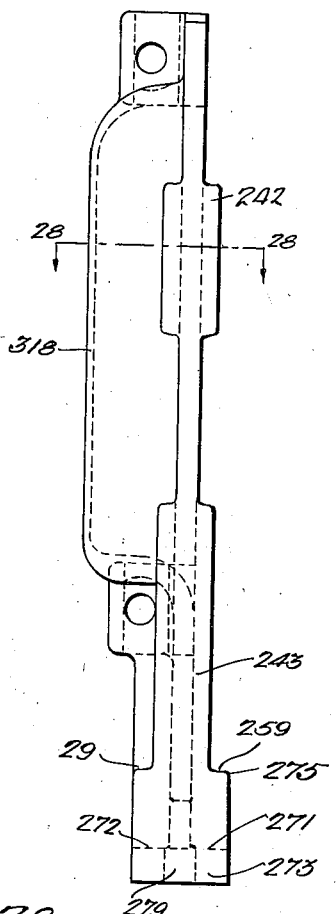
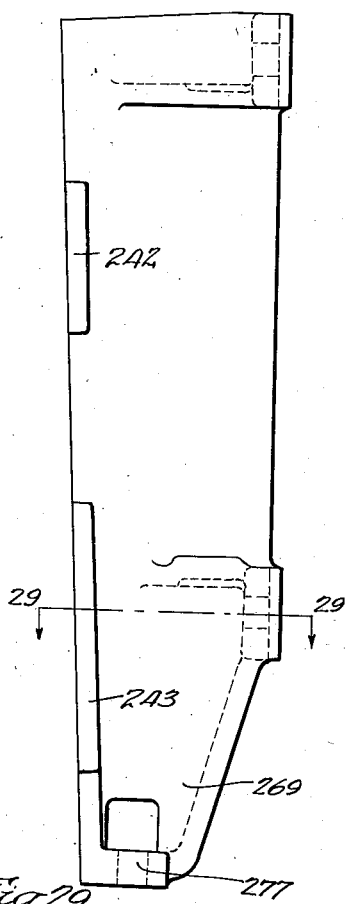
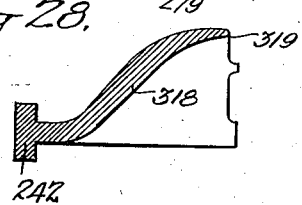
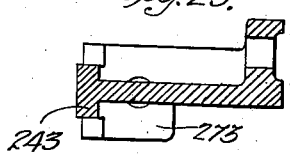
Inventor:—
Herbert E. Preston,
by his Attorneys,
Howson & Howson

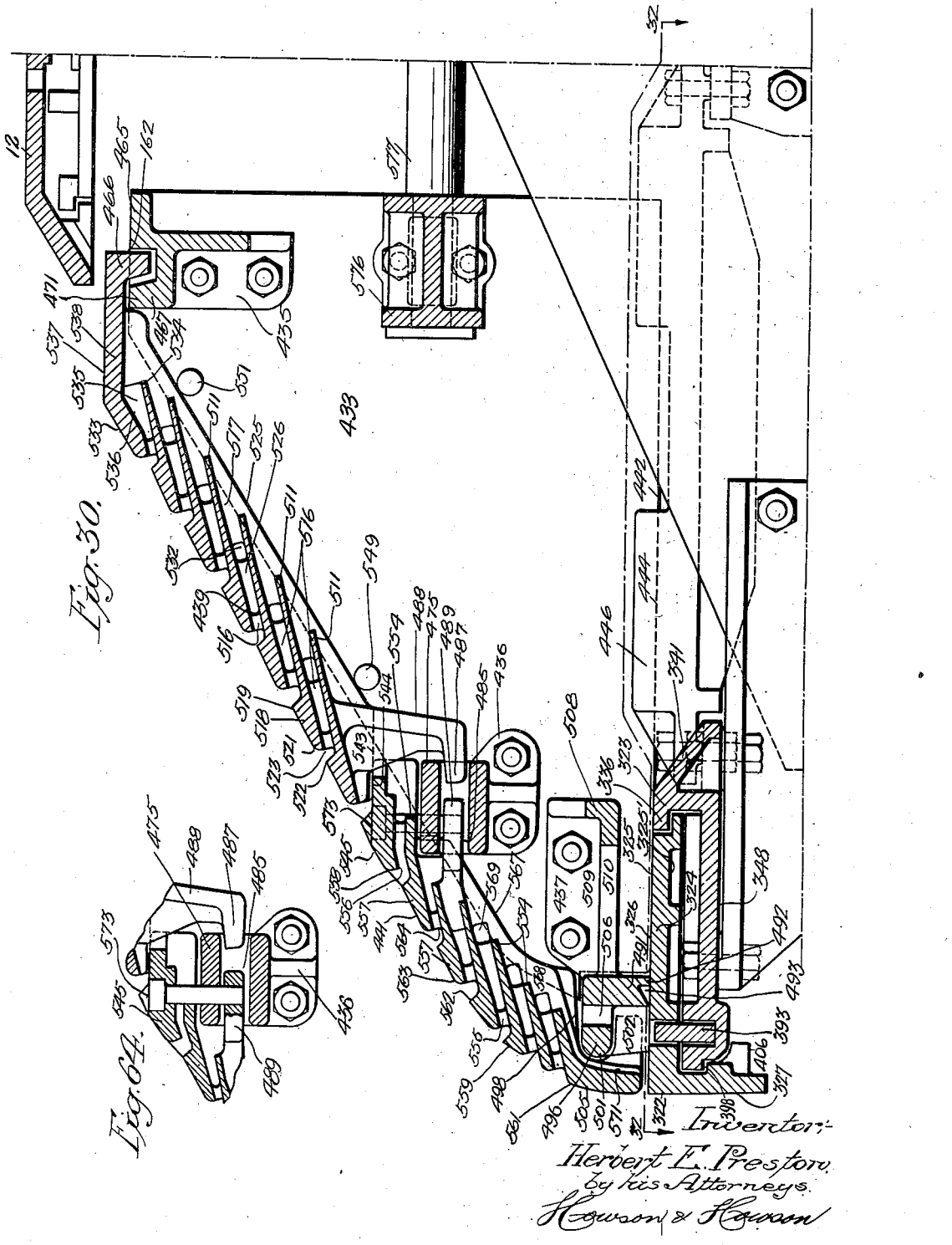

May 18, 1937.　　　　H. E. PRESTON　　　　2,081,067
STOKER
Original Filed March 22, 1923　　24 Sheets—Sheet 17
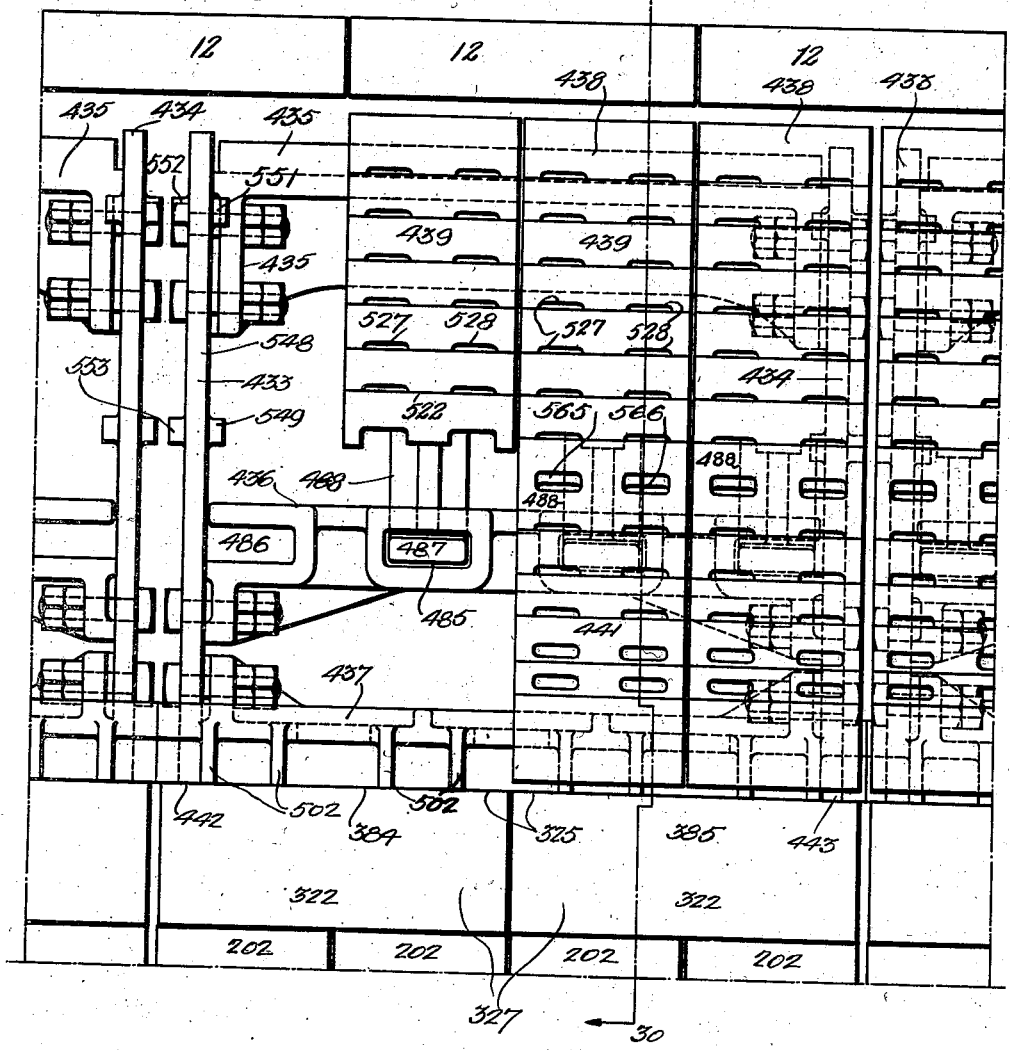

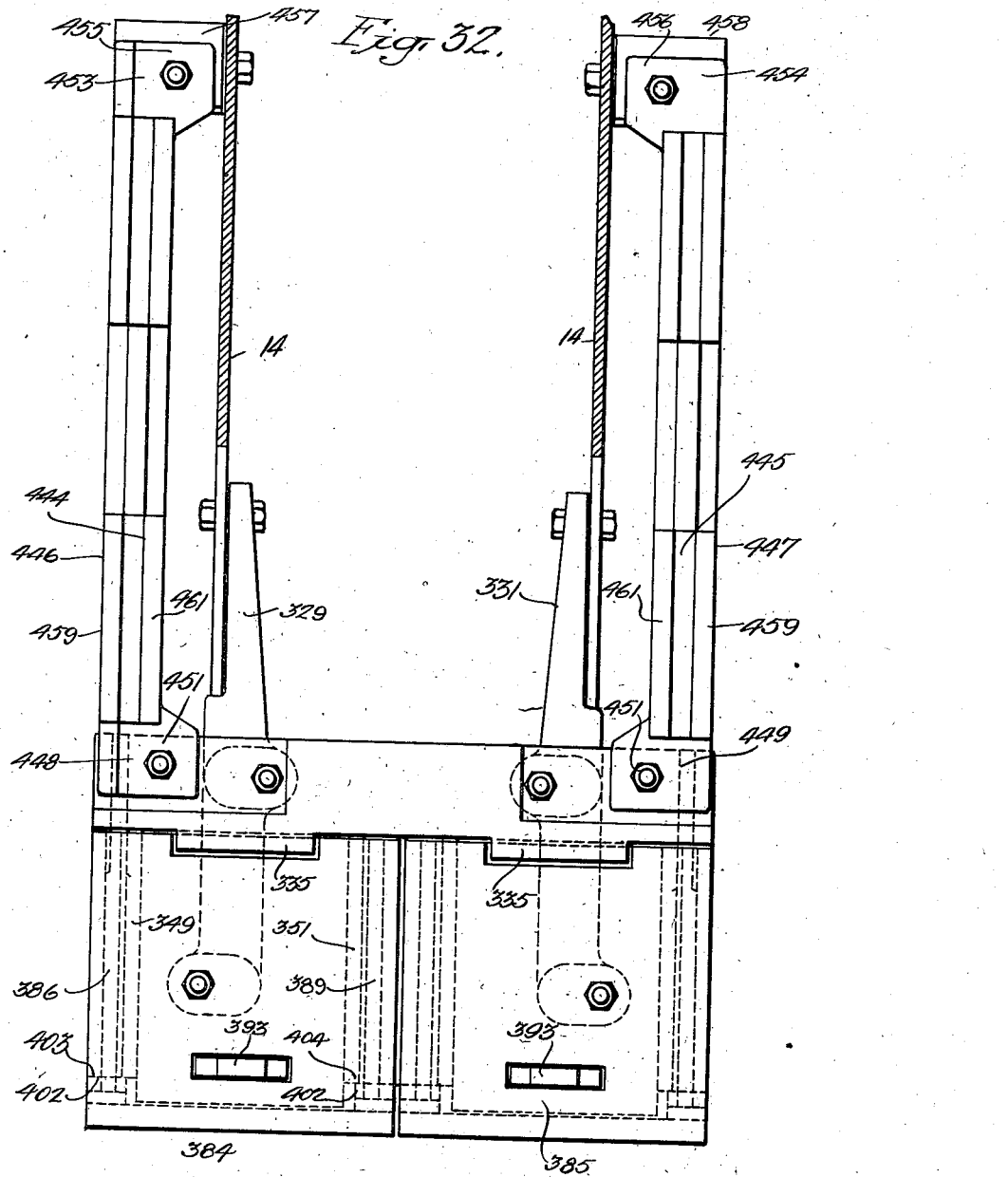

May 18, 1937.  H. E. PRESTON  2,081,067
STOKER
Original Filed March 22, 1928  24 Sheets-Sheet 19
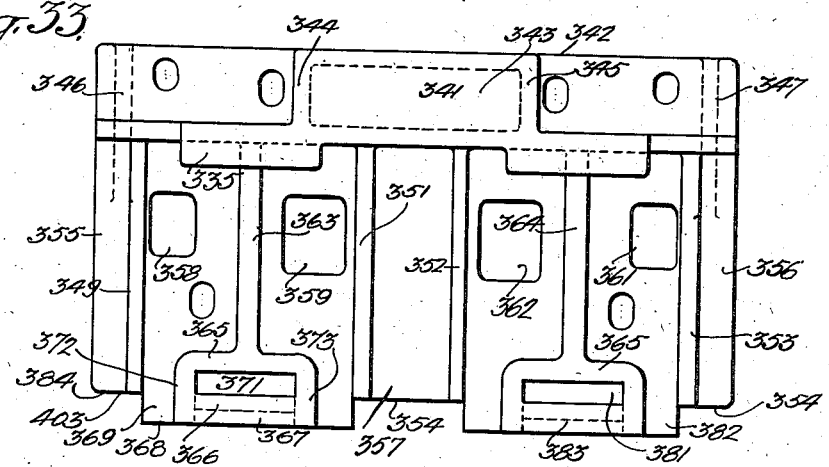
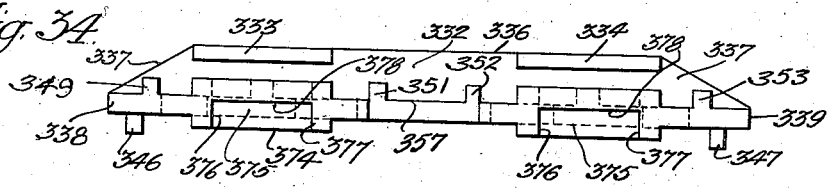
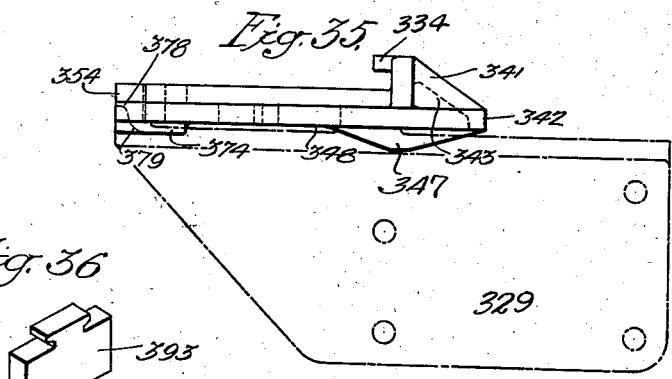
Inventor:-
Herbert E. Preston,
by his Attorneys
Howson & Howson

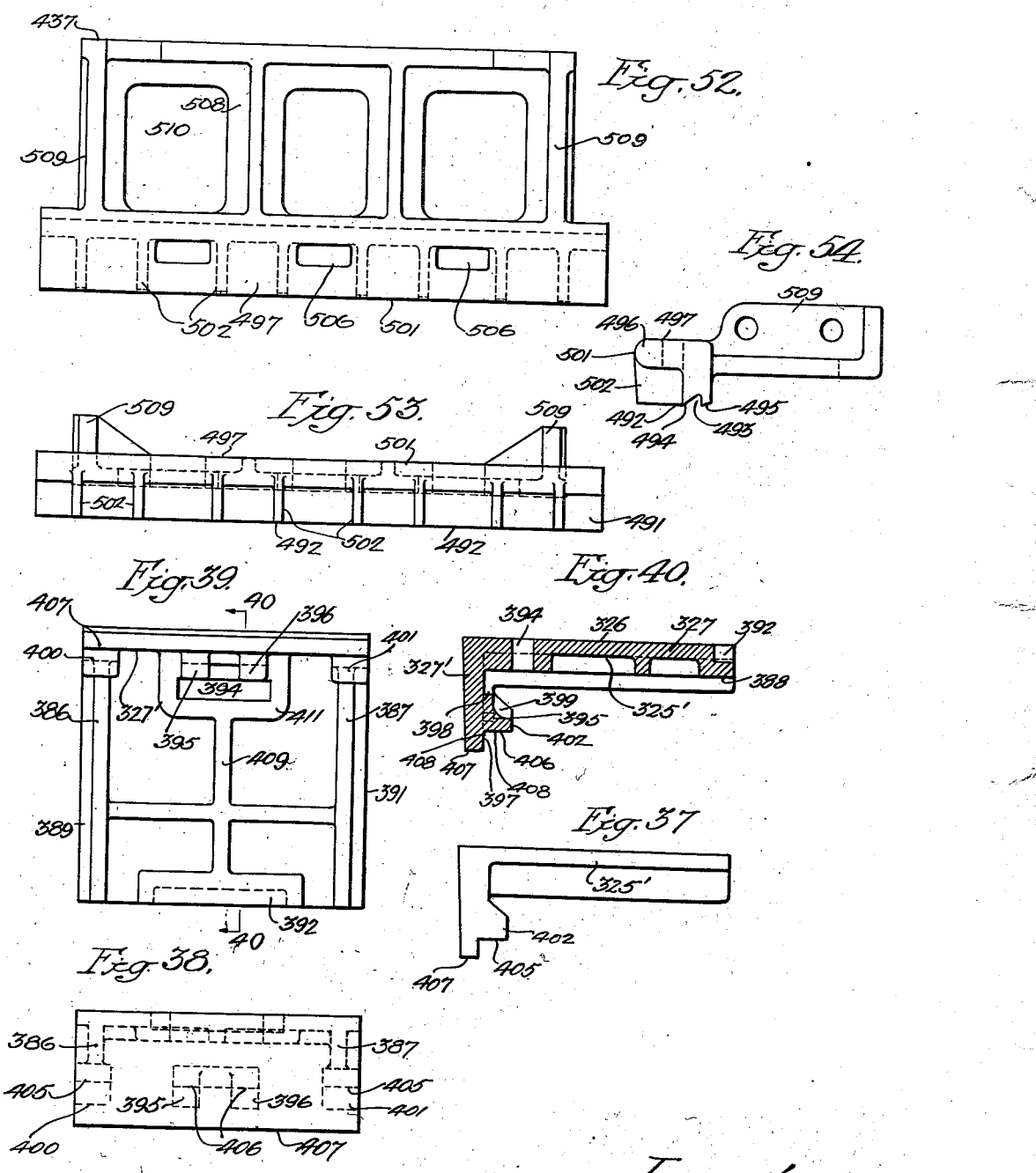

May 18, 1937.  H. E. PRESTON  2,081,067
STOKER
Original Filed March 22, 1928   24 Sheets-Sheet 21
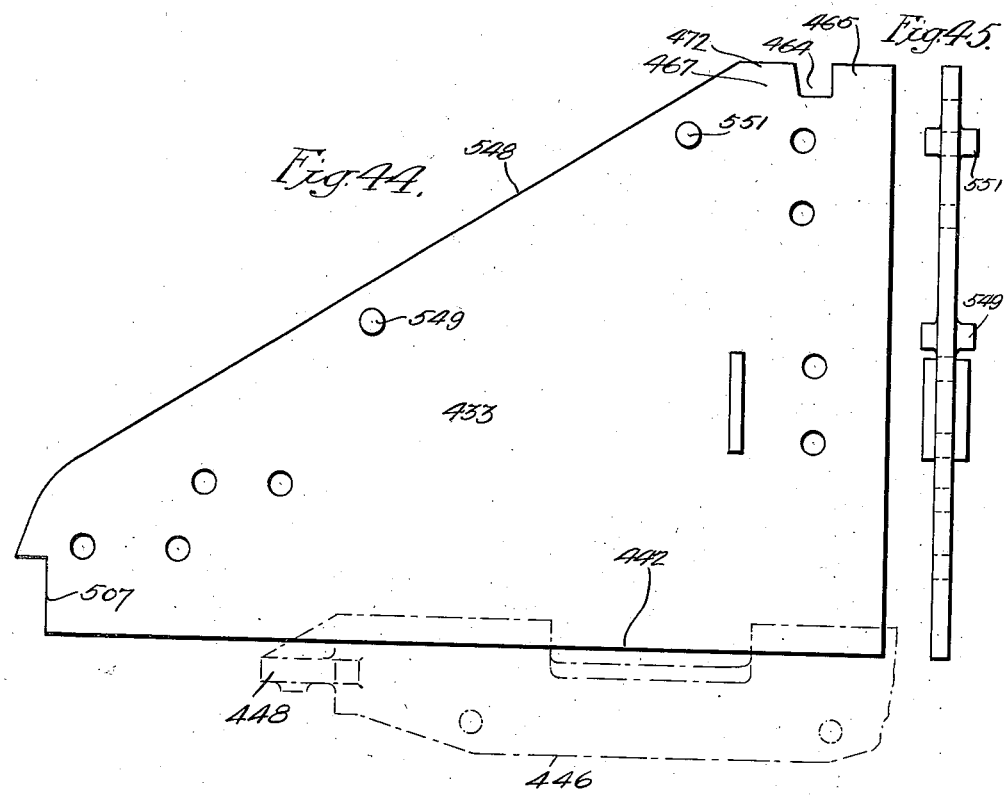
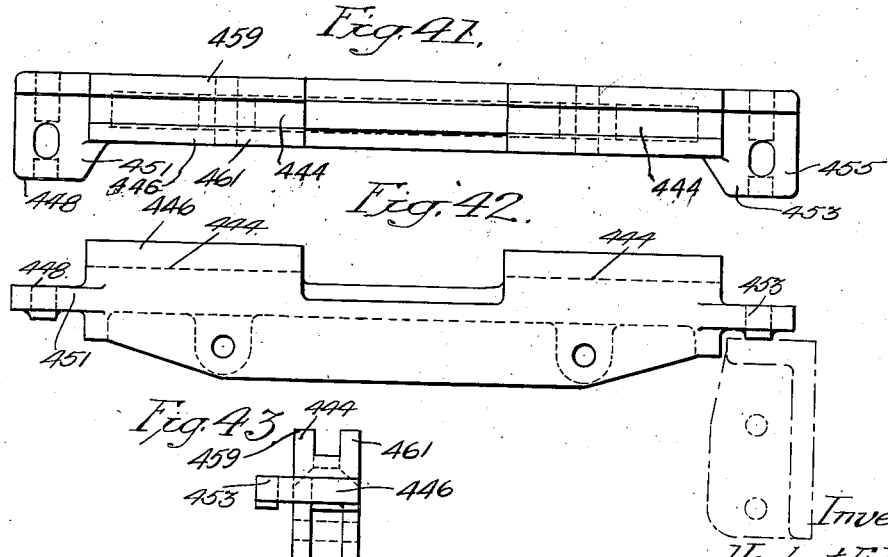

May 18, 1937. H. E. PRESTON 2,081,067
STOKER
Original Filed March 22, 1928 24 Sheets-Sheet 22
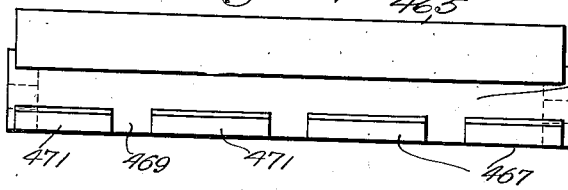
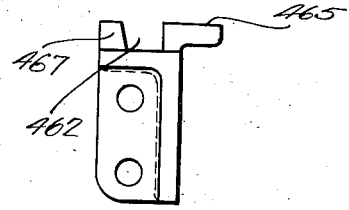
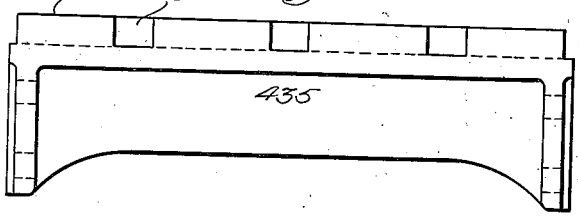
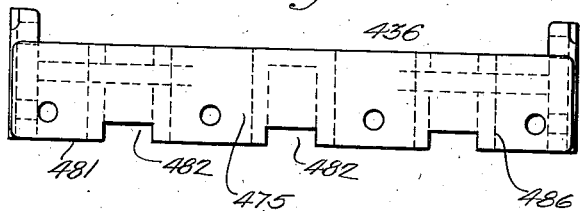
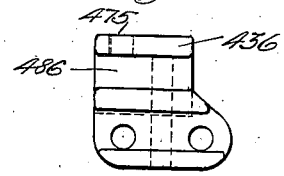
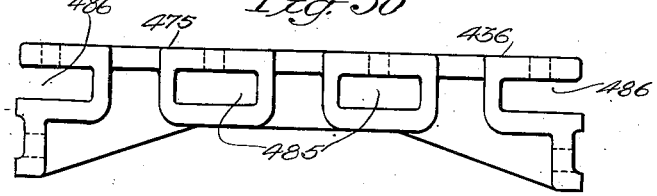
Inventor:
Herbert E. Preston
by his Attorneys
Howson & Howson May 18, 1937. H. E. PRESTON 2,081,067
STOKER
Original Filed March 22, 1923 24 Sheets-Sheet 23
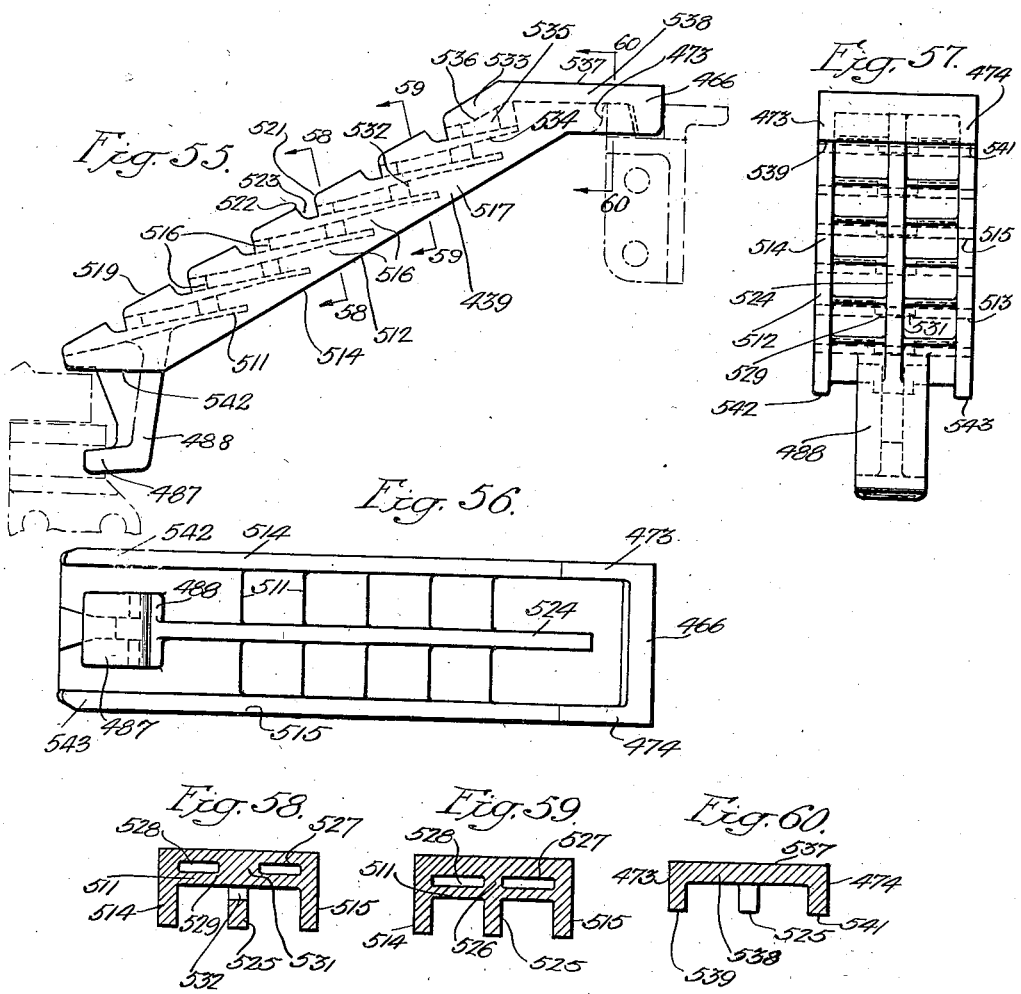

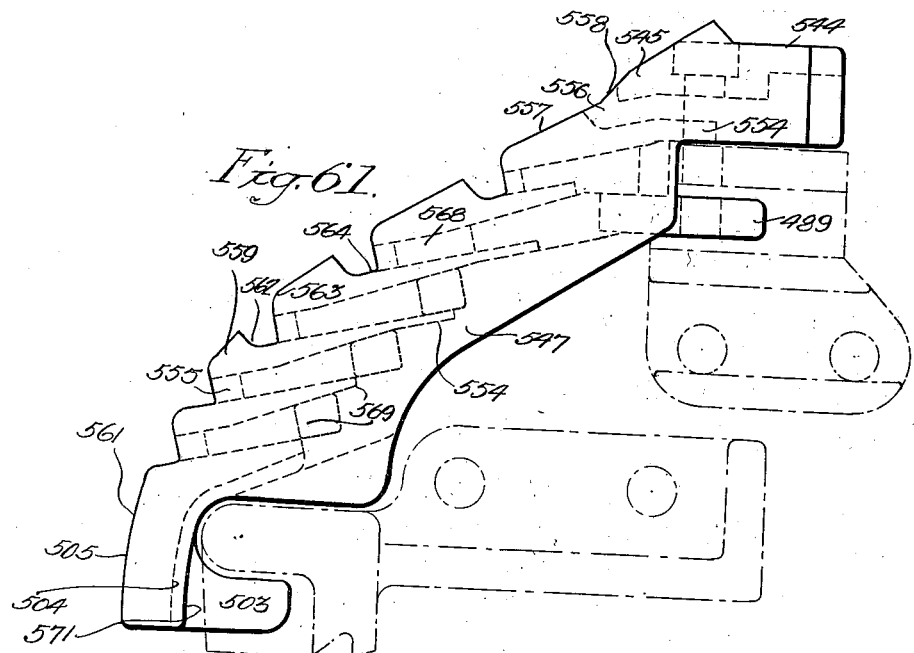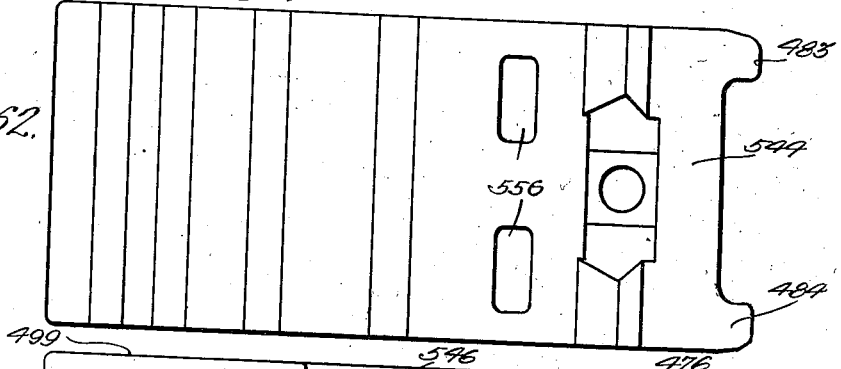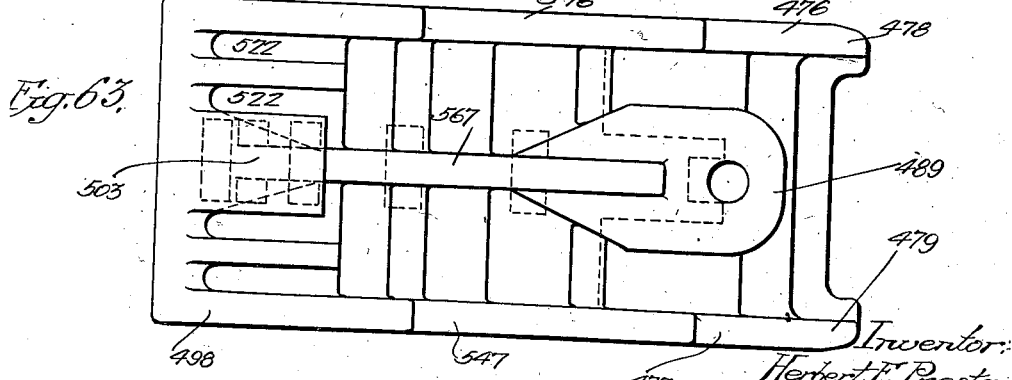

Patented May 18, 1937

2,081,067

UNITED STATES PATENT OFFICE 2,081,067

STOKER

Herbert E. Preston, Philadelphia, Pa., assignor to American Engineering Company, Philadelphia, Pa., a corporation of Pennsylvania Application March 22, 1928, Serial No. 263,900
Renewed June 20, 1935

27 Claims. (Cl. 110—44)

My invention relates to furnaces having particular relation to stokers, and it has for one object the provision of an improved stoker construction over that disclosed in the patent to Alpern No. 1,443,202, dated January 23rd, 1923.

A more specific object of my invention is to provide a stoker that shall be characterized by its extremely long length.

Another object of my invention is to provide a stoker, wherein a plurality of supporting steel beams are provided which extend the full length of the stoker and which are integral throughout their length. Such steel supporting beams permit the construction of stokers of unlimited length and of minimum weight. Moreover, the usual auxiliary support for the centre of the stoker may be eliminated, thereby simplifying the stoker structure below the tuyères. Since the supporting structure below the stoker is reduced to a minimum, a more direct air-supply is afforded the tuyère chambers, as well as the retorts, and the formation of eddy currents correspondingly decreased.

Still another object of my invention is to provide simple and efficient supporting means for a stoker, whereby the metal parts thereof may readily expand and contract. Such means is exceedingly important in the long stoker of the present invention and also in stokers using preheated air.

A further object of my invention is to provide means, whereby the arching of large masses of clinkers over the ash-pocket may be prevented. The practice, heretofore, has been to curve the upper portion of the stationary lower grate. Experience has shown that such curved portion serves as a foundation for the formation of clinker arches which are so positioned as to be unaffected by the moving extension grate, the latter serving only to force the refuse onto the clinker arch. This difficulty is met in the present invention by constructing the stationary lower grate in such manner that it presents an unobstructed face to the passage of the refuse and by incorporating the curved portion of the grate surface in the moving extension grate.

A still further object of my invention is to provide a lower grate, as well as an upper movable extension grate, which is characterized by the substantial elimination of such usual fastenings as bolts and rivets, the parts being easily and simply renewed with minimum disturbance to adjacent portions of the stoker.

A still further object of my invention is to provide an extension grate comprising a grate frame and a plurality of sectional grate bars mounted thereon, the sections of each grate bar being independently removable.

A still further object of my invention is to provide means, whereby such siftings as accumulate in the air chambers immediately in front of the lower stationary grate may be simply and efficiently removed,—the invention further contemplating means, whereby the several dampers may be independently adjusted.

A still further object of my invention is to provide means, whereby such combustible material as remains in the ashes may be completely removed,—the invention contemplating the provision of a plurality of lower grate air chambers individually connected to the stoker wind-box and provided with air openings into the ash pocket, and a plurality of extension grate sections respectively connected to the lower grate air chambers, the extension grates having openings formed to cause the heated air to enter the moving fuel at substantially right angles thereto, so that a complete mixture of air and unburnt combustible may be obtained, with consequent decrease in loss of unburned coal.

Other objects and applications of my invention, as well as details of construction and operation, whereby my invention may be practiced, will be apparent more fully hereinafter, when taken in connection with the accompanying drawings, wherein Fig. 1 is a detail, vertical sectional view of the front portion of a stoker embodying my invention;

Fig. 2 is a similar view of the rear portion of the stoker;

Fig. 3 is a detail, top plan view of the structure of Figs. 1 and 2, showing the alternate series of tuyères and retorts, the extension plates and the movable extension grate sections;

Fig. 4 is a view, partially in elevation and partially in vertical section, showing in detail one of the steel-supporting beams with its rigid mounting at one end and its anti-friction support at the other end;

Fig. 5 is an end elevational view of the structure of Fig. 4 looking from the rear end of the beam, showing the steel supporting beams in a position immediately adjacent to one side of the stoker, as well as the supporting brackets mounted on said beams;

Fig. 6 is a detail, vertical sectional view through one of the retorts, showing the pushers, as well as the operating mechanism therefor;

Fig. 7 is an enlarged detail, transverse vertical sectional view taken on the line 7—7 of Fig. 4, showing the anti-friction supporting means for the lower rear end of the stoker;

Fig. 8 is a longitudinal sectional view taken on the line 8—8 of Fig. 7;

Figure 15:
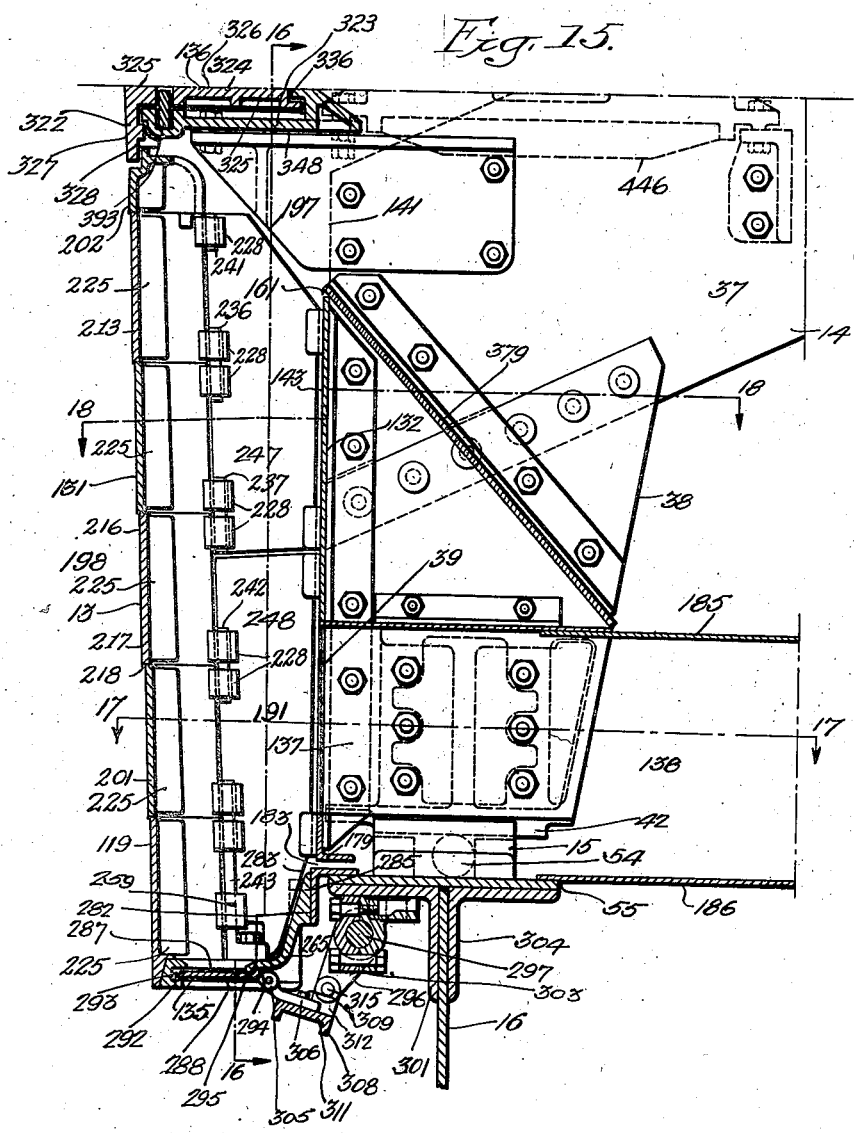

Figs. 9, 10, and 11 are perspective views of parts constituting the anti-friction bearing for one pair of steel side beams;

Figs. 12, 13, and 14 are similar views of the bearing associated with the steel beam at one side of the stoker;

Fig. 15 is an enlarged detail, longitudinal sectional view of the stationary lower grate structure and the anti-friction supporting means for the lower end of the steel supporting beams, the sectional plane being taken on the line 15—15 of Fig. 16;

Fig. 15a is a sectional view on the line 15a, 15a, Fig. 16;

Fig. 16 is a transverse sectional view taken on the line 16—16 of Fig. 15;

Fig. 17 is a horizontal sectional view taken on the line 17—17 of Fig. 15;

Fig. 18 is a view similar to Fig. 17, the sectional plane being taken on the line 18—18 of Fig. 15;

Fig. 19 is an enlarged detail view of the lower part of the structure of Fig. 15, showing the sifting grate in its open position;

Fig. 20 is a transverse sectional view taken on the line 20—20 of Fig. 19;

Fig. 21 is an enlarged vertical sectional view taken through one of the intermediate refractory blocks of the lower grate, the sectional plane being taken on the line 21—21 of Fig. 18;

Fig. 22 is a perspective view of one of the bottom blocks of the lower grate structure;

Figs. 23 and 24 are top and bottom perspective views of one of the upper blocks of the lower grate structure;

Figs. 25, 26, and 27 are respectively enlarged end, side and top plan views of one of the air-deflecting and block-supporting frames of the lower grate structure;

Figs. 28 and 29 are transverse sectional views taken on the lines 28—28 of Fig. 25 and 29—29 of Fig. 26, respectively;

Fig. 30 is an enlarged longitudinal sectional view of the movable extension grate and the grate-guard structure for the lower stationary grate, the sectional plane being taken on the line 30—30 of Fig. 31;

Fig. 31 is a detail and rear elevational view of the structure of Fig. 30, certain of the sectional grate bars being removed;

Fig. 32 is a horizontal sectional view of the grate-guard structure, as well as the adjacent supporting parts for the movable extension grate, drawn on a reduced scale, the sectional plane being taken on the line 32—32 of Fig. 30;

Figs. 33, 34, and 35 are top, end and side elevational views, respectively, of the supporting base member for the grate-bar structure of Fig. 30;

Fig. 36 is a perspective view of one of the locking keys adapted to be supported by the structure of Figs. 33 to 35, inclusive;

Figs. 37 and 38 are end and side elevational views, respectively, of the grate-guard member which is to be mounted on the structures of Figs. 34 and 35;

Fig. 39 is an inverted plan view of the structure of Fig. 37;

Fig. 40 is a transverse sectional view taken on the line 40—40 of Fig. 39;

Figs. 41, 42 and 43 are top, side and end elevational views, respectively, of one of the extension-grate guiding members;

Figs. 44 and 45 are side and end elevational views, respectively, of one of the extension-grate side plates;

Figs. 46, 47 and 48 are top, side and end elevational views, respectively, of the upper tie bar that extends between the extension-grate side plates;

Figs. 49, 50, and 51 are similar views of the intermediate tie bar for supporting adjacent ends of the grate-bar sections;

Figs. 52, 53, and 54 are similar views of the lower tie-bar frame that supports the lower ends of the extension, grate bar sections;

Figs. 55, 56, and 57 are side, bottom and end elevational views, respectively, of one of the upper sections of a grate bar;

Figs. 58, 59, and 60 are transverse sectional views taken on the lines 58—58, 59—59 and 60—60 of Fig. 55, respectively;

Figs. 61, 62, and 63 are top, side and bottom plan views, respectively, of the lower section of one of the grate bars; and Fig. 64 is an enlarged detail, vertical sectional view, showing the upper end of one of the lower sections of a grate bar with its locking pin extending therethrough into the intermediate tie bar.

Figure 1:
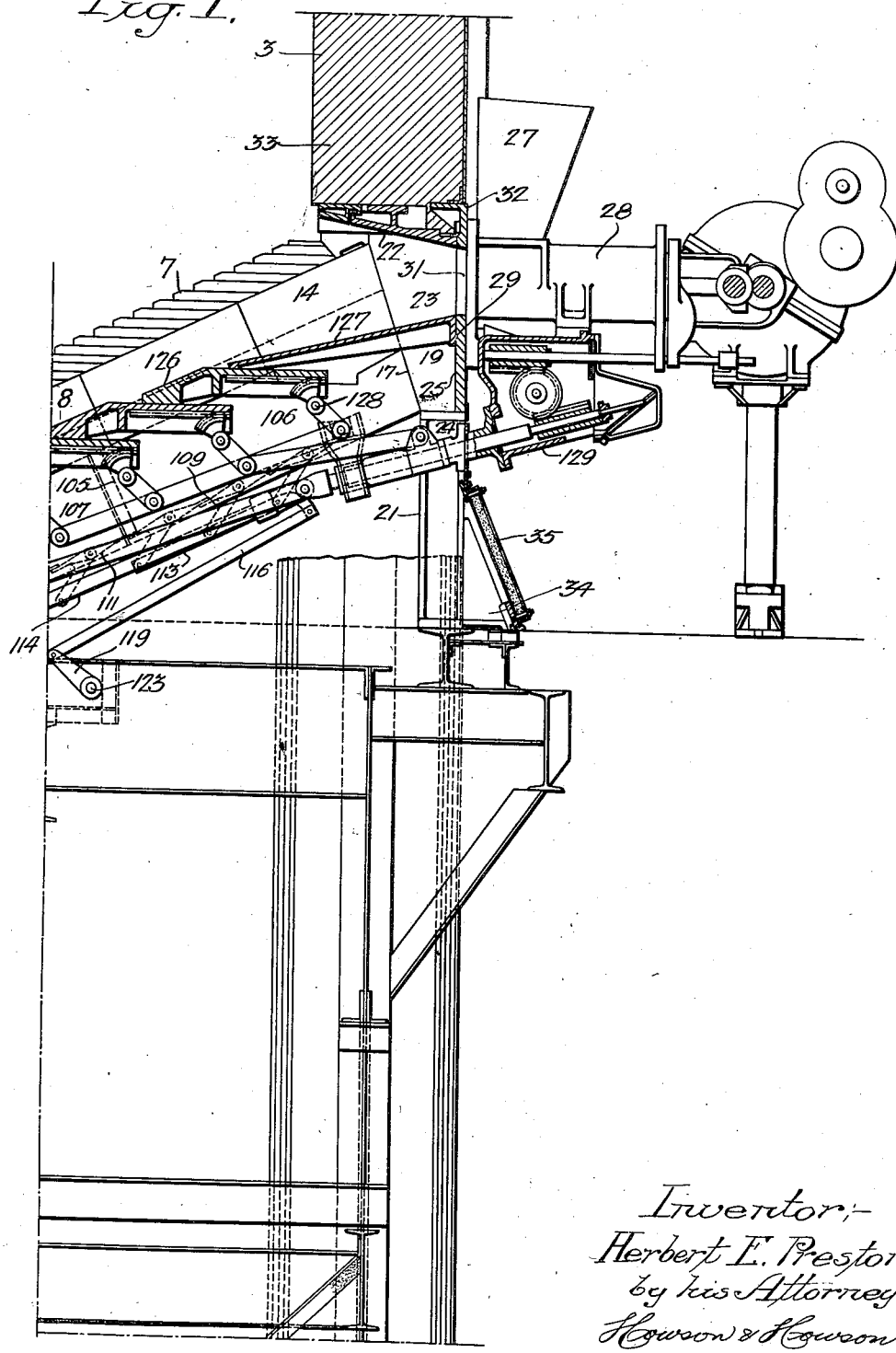

Referring to Figs. 1, 2, and 3, a furnace I is provided with an inclined, multiple-retort stoker 2 of the under-feed, forced-draft type. The stoker 2 extends from a front wall 3 rearwardly and downwardly between furnace side walls 4, 4 in the direction of a rear wall (not shown) and terminates in an ash pocket 5 having crushing apparatus 6 at its lower end.

The stoker 2 comprises broadly a plurality of series of inclined tuyère chambers or boxes 7 and a corresponding plurality of series of retorts 8 alternating therewith, constituting an upper grate surface; a plurality of movable extension-grate sections 9 disposed in line with the retorts 8 and of sufficient width to extend substantially between the center lines of adjacent tuyère chamber 7, 7; a plurality of extension plates 11 and 12 respectively disposed in line with and adjacent to the lower end of the tuyère and retort chambers 7 and 8; a plurality of stationary lower-grate sections 13, which are respectively disposed flush with the movable extension-grate sections 9 and form a downwardly and forwardly inclined wall portion of the ash pocket 5, extending across the full width thereof; a supporting side-plate construction for the foregoing parts including a plurality of steel beams 14, which are integral throughout their length and which extend substantially the full length of the stoker; and bearing means 15, whereby the lower rear end of the stoker may be afforded an anti-friction support on a main cross-girder 16, so that longitudinal expansion and contraction of the stoker 2 may occur.

The alternately positioned tuyère and retort chambers 7 and 8, respectively, are formed, at least in part, by the steel-plate beams 14 which are spaced across the width of the stoker, as shown in Fig. 5. Upper ends 17 of these beams are bolted or otherwise secured to spaced flanges 18 of bracket members 19, Figs. 4 and 6, there being one bracket member for each pair of beams, which is mounted in alignment with a retort chamber 8 on a supporting column 21. Each of the bracket members 19 is provided with an upper side 22, which extends between spaced walls 23 thereof, a lower side 24, which is mounted on the standard 21, and a front side 25 which is provided with an opening 26 through which fuel may be fed from a hopper 27 by means of a main pusher 28. A stoker front plate 29 is also mounted on the standard 21 and it is provided with an opening 31 in alignment with the bracket opening 26. A hopper flange portion 32 of the front plate 29 is adapted to support a brickwork portion 33 of the furnace front wall 3 as shown in Figs. 1, 4, and 6. Each of the columns 21 is provided with a forwardly extending base portion 34 and a strut portion 35, which terminates in the column 21 near the upper end thereof, thereby preventing a turning movement of the column 21 under the end thrust due to normal operation of the stoker.

Referring to the steel side plates 14, lower end portions 36 thereof are positioned immediately in front of the upper portion of the lower grate structure 13, as shown in Fig. 2. Each pair of plates 14, 14 has mounted on retort sides 37 thereof a downwardly extending plate section 38, a rear edge 39 of which is flush with a rear edge 41 of the beam 14, Fig. 4. Between each pair of depending plate extensions 38, in alignment with the tuyère chamber 7, is positioned a casting 42 of rectangular form which constitutes one element of the anti-friction supporting means 15. The casting 42, Figs. 7, 8, and 9 comprises a pair of side walls 43 and 44, which are bolted in engagement with adjacent sides 45 of the beam extensions 38; an upper side 46 which terminates in a transverse ridge 47 at the front edge thereof; a front side wall 48 which closes one end of the casting 42 and which is disposed flush with a front edge 49 of the beam extensions 38; and a bottom wall 51 having a horizontal bearing surface 52. A reinforcing rib 53, Figs. 7 and 8, extends inwardly from the several walls of the casting 42.

The bearing surface 52 is adapted to engage a transverse anti-friction roller 54 which is movable over a bearing plate 55 constituting an upper flange of the cross-beam 16. Movement of the anti-friction roller 54 is limited by means of a cage member 56, Figs. 7, 8, and 11, which comprises a substantially flat central portion 57, a lower side 58 of which is mounted on the bearing plate 55 of the cross-beam 16, while an upper side 59 is mounted in close proximity to the adjacent bearing surface 52 of the upper casting 42. The central portion 57 is provided with a cross recess 61 having vertical end walls 62 and spaced vertical side walls 63. The spacing of the end walls 62 is slightly greater than the length of the roller 54, but not substantially greater than the width of the bearing surface 52. The spacing of the vertical side walls 63 is sufficient to permit the maximum movement of the roller 54 that occurs when the stoker is operated, but this spacing is less than the length of the bearing surface 51. Fig. 8 shows the position of the roller when the stoker 2 is cool and, therefore, in its fully contracted position.

The cage member 56 is also provided with end portions 64 and 65, having cross flanges 66 and 67 extending upwardly from the side 59. These flanges are provided with inner sides 68 and 69 which are in alignment with the end walls 62 of the roller recess 61 and are sufficiently spaced to extend over adjacent side portions 71 and 72 of the bottom bearing surface 52 of the casting 42. It is noted that the bottom wall 51 extends below lower edge portions 73 of the plate extensions 38, as shown in Fig. 7. The cross flanges 66 and 67 are extended vertically into close proximity to the edge portions 73, 73, so that a minimum clearance space may be afforded through which coal dust may sift into the roller recess 61. The minimum clearance between the upper side 59 and the bearing surface 52 of the bottom wall 51 of the casting 42 substantially prevents the entrance of siftings into the chamber 61 from the sides of the cage member 56.

The cage member 56 may be secured in the position shown in Figs. 7 and 8 by pairs of bolts 74 which respectively extend through the end portions 64 and 65 in the flange of the main supporting cross-beam 16. In this manner, each pair of tuyère-chamber side plates 14, 14 is afforded an anti-friction support, so that the stoker 2 as a whole is supported at its lower end at a plurality of transversely spaced points.

Figs. 7 and 12 to 14 illustrate a slightly modified anti-friction supporting structure 75 for the tuyère side plate which is immediately adjacent to one of the side walls 4, 4 of the furnace 1. As therein shown, the plate extension 38 has bolted to a tuyère chamber side 76 thereof an upright casting 77. The casting 77 comprises a vertical wall portion 78, which is recessed, as shown in Fig. 12 and provided with bolt holes 79. One edge of the casting is provided with a front wall 81 which is positioned flush with the front edge 49 of the beam extension 38. An upper horizontal wall portion 82 extends rearwardly from the front wall 71 to a rear edge 83 of the casting 77, and it is provided with an upwardly extending shoulder portion 84 having a reinforcing rib 85. The portion 84 is provided with bolt holes 86, as shown in Figs. 7 and 12.

A lower wall 87 is provided with a bearing portion 88 which extends below the bottom edge 73 of the plate extension 38. The bearing portion 88 engages a roller 89 which is positioned between vertical end walls 91, 91 and vertical side walls 92, 92 of a cage member 93. The end walls 91, 91 closely fit sides 94 and 95 of the bearing portion 88 in order to prevent siftings working into the space between the walls 91 and 92. Upper sides 96 of the cage 93 are positioned in spaced relation to the underside of the bearing portion 88, whereby siftings may be prevented from reaching the roller 89. Portions 97 of the side wall 96 are recessed as well as apertured to receive clamping bolts 98 which extend through the upper plate 55 of the cross-beam 16. An opposite end portion 99 of the cage 93 is also provided with apertures for clamping-bolts 101, so that the cage 93 may be securely locked in position. The several sides 91 and 92 are sufficiently spaced to permit a movement of the roller 89 when the stoker expands, as in the case of the rollers 54.

Referring again to the tuyère and retort chambers 7 and 8, respectively, Figs. 1 to 6, inclusive, each tuyère chamber 7 is closed in its upper side by means of a series of tuyères 102 which are detachably mounted on cast-iron plates 103 removably secured to upper edge portions 104 of the spaced steel plate beams 14. These plates are preferably mounted on the retort side 37 of the steel beams 14. The mounting of the tuyères 102 away from the upper edge portions 104 of the steel plates 14 decreases the danger of damaging the steel plates by the intense furnace heat, while the use of the sectional supporting plates 103 permits the ready replacement of a damaged portion without disturbing the steel plates 14.

Each tuyère chamber 7 is divided by cross members 105 into front, intermediate and rear chambers 106, 107, and 108, respectively. The passage of air through the bottom wall of each of these chambers is controlled by damper groups 109, 111 and 112, which are respectively positioned in the chamber portions 106, 107, and 108 between the pair of spaced side beams 14, 14. The damper groups 109, 111 and 112 thus constitute a bottom wall for the tuyère chamber 7.

The dampers in each group are so positioned as to overlap when in the closed position shown in Figs. 1 and 2. These dampers are provided with arms which are connected to links 113, 114, and 115. The links 113, 114, and 115 are respectively connected to single actuating links 116, 117, and 118 mounted on lever arms 119, 121, and 122, carried by cross-shafts 123, 124, and 125. The shafts 123, 124, and 125 may be independently controlled from a point exterior of the furnace. A further detail description of the damper means for independently controlling the supply of air to the tuyère-chamber sections 106, 107, and 108 is set forth in my co-pending application, Serial No. 263,318 filed March 21, 1928, patented Jan. 22, 1935, Patent No. 1,989,024, and assigned to the American Engineering Company.

The retort chambers 8, Fig. 6, are provided with a plurality of secondary pushers 126, which extend upwardly from the extension plates 12 to a cover plate 127 adjacent the furnace openings 26 and are positioned to form a bottom wall for the retort chambers 8. The pushers 26 may be actuated by mechanism 128 from a primary source 129 which also serves to actuate the main pusher 28. This structure is further described in the co-pending application of Maxwell Alpern, Serial No. 138,469, filed Sept. 29, 1926 and assigned to the American Engineering Company.

Among the advantages of the above-described steel side-plate construction is the relatively great stoker length that may be obtained. In previous types of stokers, such as, for example, that shown in the above-noted Alpern patent, the stoker length has been limited by the method of supporting the stoker parts, since a stoker of greater than average length would require such heavy and cumbersome parts as to be prohibitive. It has been demonstrated in practice that the steel side-plate construction shown in the drawings eliminates the requirement for heavy cumbersome supporting parts and thereby eliminates a large amount of material with resulting saving in weight and a corresponding decrease in the load on the furnace walls.

Moreover, as shown in Figs. 1 and 2, no exterior support is required for the center of the stoker, as was necessitated by the previous constructions. The only supports required are the stationary front mounting afforded by the wall 3, and the movable rear mounting afforded by the bearing means 15. Thus, the stoker construction below the tuyères is very greatly simplified and the air may be supplied to the stoker without the necessity for avoiding undesirable obstructions. Since the air may be supplied directly to the desired stoker parts, the usual eddy currents are eliminated and air resistance correspondingly decreased. Furthermore, the tuyère and pusher stoker parts may be removed in sections without disturbing the side-plate supporting means, thereby decreasing the maintenance cost for this portion of the stoker.

Referring to Figs. 2 and 15 to 29, inclusive, each of the lower grate sections 13 therein shown comprises a rear wall 131, a front wall 132, side walls 133 and 134, a bottom wall 135 and a top wall 136. These walls define an upwardly extending air chamber or so-called grate box having a lower air-inlet opening 137 connected by means of an air duct 138 to a main air chamber 139 positioned directly beneath the tuyère and retort chambers 7 and 8. This air chamber also has a main, upper air-outlet opening 141 through which the air may pass into a grate chamber 142 formed in each extension grate section 9.

A front wall 132 of each lower grate section comprises a main upper plate 143, Figs. 15, 16, and 18, which is mounted on flanges 144 and 145 of vertical angle irons 146 and 147, so as to abut against vertical edges 36 and 39 of the side beams 14, 14 and the vertical extensions 38, 38, respectively. Flanges 148 and 149 of these angle irons are secured to adjacent tuyère sides 151 of successive tuyère chambers 7, 7. The upper front closure plate 143 is further secured in position by means of angle irons 152 and 153, flanges 154 and 155 of which are bolted to the front side of the plate member 143, while flanges 156 and 157 are bolted to the retort sides 37, 37 of the beams 14, 14 and to the adjacent sides of the extensions 38, 38 thereof.

Filler bars 158 and 159 are positioned between the upper end portions of the flanges 156 and 157 of the angle irons 152 and 153 respectively and the adjacent sides of the beams 14, 14 as shown in Fig. 18. The angle irons 152 and 153, which are positioned in alignment with the retort chambers 8, are relatively short as compared with the angle irons 146 and 147 which are disposed in alignment with the tuyère chambers 7. The pair of angle irons 146 and 147 extend from an upper edge 161 of the front closure plate 143 to a point just above bearing plate 55, while the angle irons 152 and 153 extend from the upper edge 161 of the closure plate 143 to a lower edge 162 thereof.

The lower edge 162 of the closure plate 143 is spaced from the bearing plate 55 as shown in Fig. 16, so that a desired open space 163 may be obtained. The length of the upper closure plate 143 of each grate section 13 is sufficient to permit vertical edges 164 and 165 thereof to be positioned in substantially the center line of successive tuyère chambers 7, 7. The upper edge 161 of the closure plate 143 is positioned in desired spaced relation to the upper wall 136 of the grate chamber or box so as to form the air outlet opening 141, Fig. 15. In this manner, the upper, front-wall portion of each of the lower-grate sections 13 is mounted in position on the lower rear end of the steel-supporting beams 14.

The lower open portion 163 of the front wall 132 of each grate section 13 is partially closed by a pair of spaced plate members 166 and 167, Figs. 15a, 16, and 17, forming the lower air-inlet opening 137 directly in alignment with the retort chamber 7. The plate 166 is mounted on the lower portion of the flange 144 of the angle iron 146, while the plate 167 is similarly mounted on the angle iron 147. Filler strips 168 and 169, Fig. 17, are respectively positioned between the lower portions of the flanges 148 and 149 and the tuyère sides of the plate extensions 38, 38. Opposite vertical edges 171 and 172 of the plates 166 and 167 are respectively positioned flush with the edges 164 and 165 of the upper plate member 143, while adjacent spaced edges 173 and 174 are respectively positioned flush with adjacent retort sides of successive plate extensions 38, 38, Fig. 17. Upper edges 175 and 176 of the lower plate members 166 and 167 are positioned in abutting relation to the lower edge 162 of the upper plate 143. Lower edges 177 and 178 are positioned in spaced relation to the bearing plate 55, as shown in Figs. 15 and 19.

The lower edge portions of the lower pair of plates 166 and 167 are further supported by means of an angle iron 179 which extends between the center-line of successive pairs of tuyère chambers 7, 7 as in the case of the upper plate 143. A vertical flange 181 of the horizontal angle iron 179 is secured to an inner side of these edge portions, while a horizontal flange 182 is positioned in spaced relation to the bearing plate 55 of the cross-beam 16 to provide a transverse opening 183 extending across the width of the grate section 13. Thus, the lower front-wall portion of each of the grate sections 13 is supported on the relatively long angle irons 146 and 147, which, in turn, are secured to the steel side-plate construction 14, 38. The vertical meeting edges of successive upper and lower pairs of closure plates 143, 143 and 167, 166 may be closed by means of a vertically-extending plate 184, Fig. 18, which is mounted on a front side of adjacent portions, and which extends the full width of the upper and lower closure plates 143 and 166—167.

Each of the air ducts 138, which extends forwardly from the lower air opening 137 in the front wall 132 of each grate section 13, comprises an upper plate 185, Fig. 15, which extends between successive beam extensions 38, 38, so as to alternate with the bearing means 15. The passage 138 further comprises the spaced beam extensions 38 and the bearing plate 55. A remaining portion 186 of the air passage 138 is in slidable engagement with the portion just described to permit the relative movement occurring upon the expansion and contraction of the stoker. The passage 138 terminates at 187 in the main air chamber 139, and it is provided with a control damper 188.

Each of the side walls 133, 134 of the lower grate chamber comprises a pair of upper and lower plate frames 189 and 191, respectively, Figs. 16, 17, and 18, which are mounted directly in the center line of the tuyère chamber 7 over the meeting edges of successive pairs of upper and lower, rear-wall closure-plates 143, 143 and 166, 167. These plates constitute a common wall for successive pairs of lower, stationary grate-sections 13. The upper plate frame 189 is provided with transversely-extending spaced feet 192 which are bolted to the upper plate member 143. The lower grate frame 191 is also provided with transversely-extending feet 193 and 194, which are respectively bolted to the upper plate 143 and to the vertical flange 179 of the horizontal angle iron section 181. The upper and lower members 189 and 191 are slightly spaced to provide a relatively small air passage 195 therebetween. The upper grate frame 189 is provided with an upwardly projecting portion 196 having a beveled front edge 197 extending downwardly and forwardly to the upper supporting foot 192.

The rear wall 131 of each grate section 13 comprises a plurality of grate blocks 198, which are disposed in side-by-side as well as superposed relation, forming horizontal and vertical rows. Each vertical row comprises a lower, main-supporting grate block 199, a plurality of intermediate grate blocks 201 and an upper grate block-cap 202.

As shown in Figs. 2, 15, 17, 18, and 21, each intermediate grate block 201 comprises a rear wall 213 and side walls 214 and 215. The rear wall 213 is provided with an upper vertical surface portion 216 and a lower, forwardly and downwardly inclined surface portion 217. The surface portions 216 and 217 constitute ash-abutting surfaces which are directly exposed to the furnace heat. The upper surface portion 216 is forwardly offset with respect to the adjacent inclined lower portion 217 of the preceding grate block 201. In this manner, a lower edge 218 of the rear wall 213 of one grate block 201 overhangs an upper edge 219 of the wall 213 of the next grate block directly below the same, thereby providing a plurality of overhanging shoulder portions that are so positioned as to prevent the lodging of refuse material thereon.

The side wall 214 is provided with a plurality of air-deflecting ribs 220 that abut against air-deflecting ribs 221 of the opposite wall 215 of the next adjacent grate block 201. The ribs 220 and 221 extend forwardly and downwardly from the rear wall 213 and terminate in substantially horizontally extending front end portions 222. Thus, the adjacent side walls 214 and 215 of the grate blocks 201, 201 are maintained in desired spaced relation and a plurality of air-outlet passages 223 are also formed which extend forwardly and upwardly in a direction substantially opposite to that of the downwardly moving material in the ash pocket 5. An advantage of discharging the air in this manner is that it causes a more complete burning of such combustible as still remains in the refuse in the ash pocket 5. The air may be supplied to the air passages 223 from the air chamber of the lower grate-section 13 through a plurality of apertures 224, Fig. 21, positioned forwardly of the air passages 223 in the side walls 214 and 215 of the grate block. A plurality of spaced heat-radiating ribs 225 extend forwardly from an inner side 226 of the rear wall 213, each rib being substantially triangular in cross-section and extending the full length of the grate block. The inner upper edges 227 of the rear and side walls 213, 214 and 215 may be beveled as shown in Fig. 21.

The front edge of the grate-block side-wall 214 terminates in a pair of spaced locking lugs 228, while the side wall 215 terminates in a pair of spaced locking lugs 229. The upper and lower locking lugs 228, 228 for the side wall 214 are respectively provided with vertical recesses 232 and 233 adapted to receive portions 234 and 235 of flanges 236 and 237 extending inwardly of the grate section 13 from a rear edge portion 238 of the upper plate frame 189. The upper plate member 189 is provided with a relatively short flange 241 in addition to the flanges 236 and 237, the former corresponding in dimension to either of the flange portions 234 or 235. The length of the flange portions 234 and 235 is such as to permit the disengagement of the pair of lugs 228, 228 from the plate members 189 upon a relatively slight vertical movement. The lower plate frame 191 is provided with a locking flange 242, corresponding to the flanges 236 and 237, and a relatively long flange 243 for reasons as will presently appear. The plate frames 189 and 191 are also provided with locking flange portions 239, which are similar to the flange portions just described but extend in the opposite direction thereto inwardly of the next adjacent grate section 13.

The upper and lower locking lugs 229, 229 of the other side wall 215 of the intermediate grate block 201 is provided with a pair of recesses 245, 245 which co-act with locking flanges 246 corresponding in all respects to the flanges 236, 237, 242, and 243 just described for the plate frames 189 and 191. The flanges 246 extend transversely of a pair of upper and lower plate frames 247 and 248, respectively. The frames 247 and 248, Fig. 16, are respectively bolted on the upper plate member 143 and the horizontal angle iron 179. The pairs of plates 189—191 and 247—248 thus provide detachable mountings for the intermediate grate blocks 201 in a vertical row immediately adjacent to one side of the grate sections 13.

The next vertical row of grate blocks is similarly secured to the spaced pairs of frames 247—248 and 249—250, each frame having inwardly extending locking flanges, 251, Fig. 18, co-acting with the locking lugs of the intermediate grate blocks 201 so as to permit detachment upon a relatively small vertical movement. The dimensions of the grate sections 13 is such that the plate frames 249 and 250 are substantially in alignment with the centre line of the retort chamber 8. The next vertical row of grate blocks is supported by the plate frames 241—250 and 252—253, while the side vertical row is supported on the plate frames 250—253 and 254—255. The frames 254 and 255 constitute at least a portion of the side wall 134 of the lower grate chamber that is opposite to the side wall 133.

The lower supporting grate block 199 of each vertical column is shown in vertical section in Figs. 15 and 19 and in perspective in Fig. 22. The lower grate block 199 is constructed substantially the same as the intermediate grate blocks 201, with the exception that a lower pair of lugs 256, 256, which are respectively mounted on side walls 257, 257, are provided with recesses 257' which are somewhat deeper than the recesses of the upper pair of lugs. This lower pair of recesses 257' are closed at their upper ends by supporting walls 258 which engage shoulders 259, formed by enlarging or widening the lower end portion of the flange 243 of each lower frame plate, as shown in Figs. 15, 19, and 25. The lower grate block 199 of each vertical column is thus hung or directly supported on the lower end portions of a pair of lower grate-plate frames, while the weight of the remaining grate blocks in each row is directly carried by the lower grate block. The dimension of these locking flanges and recess portions is such that the lower grate block 199 may also be moved rearwardly away from the lower grate frames upon a relatively small vertical movement thereof.

A front wall 260 of each of the lower grate blocks 199 is provided with a flange portion 261 that extends below the lower edges of the grate-block side walls 257, 257. An outer side 262 of the flange 261 is positioned in alignment with the beveled or inclined surface portion 217, while an inner side is provided with an oppositely beveled surface portion 263 adapted to abut against a complementary rear edge portion 264 of a plate member 265, Figs. 15, 16, 19, and 20, constituting the bottom wall 135 of the grate chamber. The upper portion of the inclined wall 263 is provided with a shoulder 266 which is supported on an upper side 267 of the plate member 265, thereby providing a further secondary mounting for the lower grate blocks 199.

It is noted that the vertical rows of the grate blocks define an approximately flat surface that is exposed to the heated ashes in the pocket 5, and that this surface is inclined downwardly and forwardly, so that an ash pocket of increasing cross-sectional area may be obtained as the ashes are removed in the direction of crusher apparatus 6 positioned at the bottom of the ash pocket 5, Fig. 2. Moreover, a plurality of air-outlet openings in this exposed surface are provided between successive vertical rows of grate blocks, the air being deflected as it passes into the ash pocket 5 forwardly and upwardly in a direction opposite to that of the downwardly moving refuse. Furthermore, the several grate blocks, being secured in position without the use of bolts or rivets, may be readily renewed merely by first moving the grate block a relatively small vertical distance and then further moving said grate block rearwardly and outwardly of the lower-grate structure.

Referring to the bottom member 265, Figs. 15, 16, 19, and 20, there is one such member provided for each grate section 13, and its length is slightly less than the distance between the centre-line of successive lines of tuyères, thereby affording a packing recess between the adjacent ends of successive pairs of lower plate members 265. The plate member 265 is bolted to the intermediate lower-plate frames 248, 250 and 253, as shown particularly in Figs. 16 and 20. The lower end portion 269 of each of these frames is provided with an oppositely extending pair of base flanges 271 and 272, forming a foot 273 which is adapted to abut against an apertured portion 274 of the member 265. A transverse opening 275 is formed in the adjacent vertical plate portion of the frame adapted to receive a head 276 of a locking bolt 277, the body portion 278 of which extends through a central aperture 279 in the foot 273. The end portion of the bolt 277 extends through the aperture of the plate portion 274 and terminates in a head 281. The securing of the bottom plate 265 in this manner on the three lower frames 248, 250, and 253 insures the rigid mounting of the same.

A front portion 282 of the lower plate member 265 is extended upwardly and forwardly complementary to beveled edge portions 283 of the lower-grate frames 248, 250 and 253, and it is bolted to one flange 284 of an angle 285, a horizontal flange 286 of which slidably engages the bearing plate 55 of the cross-beam 16. A sealing connection is thus obtained between the bottom plate 265 and the supporting cross-beam 16, permitting the longitudinal expansion and contraction of the stoker and hence a rearward and forward movement of the lower grate structure 13 without opening the lower grate air chamber to the outside. The connection between the angle 285 and the member 265 is preferably adjustable, whereby slight inaccuracies in construction may be compensated for and the flange 286 still maintained in sliding engagement with the bearing plate 55.

As shown in Figs. 15 to 20, inclusive a horizontal portion of the bottom plate member 265 of each lower-grate section 13 is provided with, say, four openings 287 through which such siftings as pass through the grate blocks into the grate air chamber may be discharged. The removal of these siftings from the lower air chamber or so-called "grate box" is necessary in order not only to prevent the blocking of the air passages, but also to avoid danger from fire. The openings 287 are normally closed other than when it is desired to remove the siftings by means of a plurality of damper plates or gates 288, there being one gate for each outlet opening. Each of the gates 288 is slidably mounted in grooves 289 and 291 formed in opposite side walls of the outlet passage 287. As shown in Fig. 15, when the siftings gate 288 is closed, an inner end portion 292 extends into a recess 293 formed in a rear wall of the outlet passage 287, while an upper flange portion 294, at the front end of the siftings gate 288, abuts against a shoulder 295 formed in the front wall of the passage 287.

The sifting gates 288 of each of the lower-grate sections 13 may be simultaneously operated by an arm 296 and linkage extending from a cross-shaft 297, Fig. 19. The shaft 297 is mounted in a plurality of bearings 303 on an underside 298 of one flange 299 of an angle iron 301, that is secured to a vertical cross-plate 302. The angle iron 301, as well as a second angle iron 304, together with the cross-plate 302 constitute the cross-beam 16 that supports the entire weight of the lower end portion of the stoker. Each of the bearings 303 is positioned substantially in the center-line of a retort chamber 8.

Referring to the linkage, each of the sifting gates 288 is provided with a rearwardly extending shoulder portion 305 adapted to afford a pivotal mounting to a block 306. Each block may be secured in adjustable relation to a cross-link 308, which extends between the center-line of successive pairs of tuyère chamber 7, 7 by means of bolts 309. As shown in Fig. 19, the blocks 306 are adjustably clamped by the bolt 309 to an upper side 311 of the cross-link 308, thereby permitting the independent adjustment of each of the sifting gates 288 associated with any one lower-grate section 13. Such independent adjustment is desirable by reason of inaccuracies in the parts which generally are rough castings. The ends of the cross-links 308 are respectively provided with pairs of spaced upstanding lugs 312 between which fit the arms 296. Pins 315 serve to connect pivotally the arms 296 and the pairs of upstanding lugs 312 and 312.

When the cross-shaft 297 is turned in one direction, the sifting gates 288 of each lower-grate section 13 are moved from the closed position of Fig. 15 to the open position of Fig. 19, permitting such siftings as accumulate in the lower-grate air chambers to be discharged therefrom. The removal of the siftings is facilitated by the force of the compressed air in the grate air chambers. The opposite movement of the cross-shaft 297 causes the siftings gates 288 to move from the open position of Fig. 19 to the closed position of Fig. 15. It is noted that the upper rear corner of each of the gates 288 is provided with a beveled portion 316 which tends to prevent the blocking of the gates 288 during their closing movement.

Reverting again to the air-distribution means for each of the lower-grate sections 13, as shown in Figs. 16 and 17, the grate-frame plates 248 and 253 are provided with oppositely curved air-deflecting portions 317 and 318 extending across substantially the entire width of the air-inlet opening 137. Figs. 25 to 27, inclusive, show end, side and top-plan views of the grate-plate frame 253 with its air-deflecting portion 318, while Figs. 28 and 29 show cross-sectional views of the same. A front edge portion 319 of the curved frame portion 253 is tapered in order to decrease air resistance. As shown in Fig. 17, a front edge portion 321 of the central grate frame 250 is similarly beveled across the full width of the air-outlet opening 137. The curvature of the deflecting portions 317 and 318 is such as to deflect the air entering these portions of the grate section 13 in the direction of the end plates 191 and 255, respectively. In this manner, the air entering each grate section 13 is equally diverted and caused to pass over the front side of the grate blocks where the radiating vanes 225 further diffuse the air currents.

The upper wall 136 of each of the lower-grate sections 13 is formed by a grate-guard structure 322, of which Figs. 15 and 16 are longitudinal and transverse sectional views, respectively. The structure 322 comprises a base-plate member 323 and a sectional guard-plate member 324, which is detachably interlocked therewith,—the sectional guard-plate member 324 constituting an upper rear corner of the lower-grate section 13, and comprising an upper horizontal wall 325 having a supporting surface 326 for the lower, rear end portion of the adjacent movable extension-grate section 9 and also a downwardly and forwardly inclined rear wall 327 having a substantially flat exposed surface 328 constituting a continuation of the approximately flat grate surface formed by the plurality of grate blocks in the lower-grate sections 13.

As shown in Figs. 15, 16 and 30 to 35, inclusive, the base-plate member 323 is provided for each of the lower-grate sections 13, extending between the center-line of successive pairs of tuyère chambers 7, 7. Intermediate portions of each base-plate member 323 are bolted or otherwise secured to upper, rear flanged portions of bracket members 329 and 331, Fig. 32, which are respectively bolted on the retort sides of adjacent rear-corner portions of successive beams 14, 14. The plate member 323 is provided with an upstanding flange 332 which extends across the front end portion thereof. A pair of spaced flanges 333 and 334 extend outwardly from the cross-flange 332, forming overhanging shoulder portions, and are so positioned that upper sides 335 thereof are disposed in substantial alignment with an upper edge 336 of the cross-flange 332. The upper sides 335 of the locking shoulder portions 333 and 334 and the upper edge 336 of the cross-flange 332 are disposed in substantial alignment with the horizontal supporting surface 326 of the guard-plate member 324. End portions 337, 337 of the cross-flange 332 adjacent to opposite side edges 338 and 339 of the base-member 323 may be beveled, as shown in Fig. 34.

A wall 341 extends forwardly and downwardly to a front edge 342 of the base-plate member 332 from a portion 333 of the cross-wall 332 positioned between the locking ribs 333 and 334. An opening 343 is formed in a portion of the base plate 323 directly beneath the wall 341. The chamber formed by the inclined wall 341 may be closed at its ends by vertical walls 344 and 345. The front end portion of the base plate 323 may be reinforced by a pair of spaced ribs 346 and 347 which extend downwardly from an underside 348.

The upper side of the base member 323 is provided with two pairs of ribs 349, 351 and 352, 353 which extend forwardly and rearwardly from the cross-flange 332 to a rear edge 354. The ribs 349 and 353 are spaced inwardly of the side edges 338 and 339, respectively, to form supporting shoulder portions 355 and 356, while the ribs 351 and 352 are spaced to form a somewhat similar supporting wall-portion 357. Pairs of relatively small and large air openings 358, 359, and 361, 362 are formed in the portion of the base plate 323 between the pairs of ribs 349, 351 and 352, 353, respectively.

Ribs 363 and 364, which extend rearwardly from the cross-flange 332, are respectively positioned substantially centrally between the pairs of side ribs 349, 351 and 352, 353. The rib 363, Fig. 33, terminates at its rear end in a cross-wall 365, which is positioned in spaced relation to a second cross-wall 366, an outer side 367 of which is positioned in alignment with an edge 368 of a projecting base-plate portion 369 which extends rearwardly beyond the edge 354. The opening 371, which is formed between the spaced walls 365 and 366, is closed at its ends by a pair of walls 372 and 373 which terminate in the edge 368 of the projecting portion 369. A bottom wall 374 of the recess 371 is positioned slightly below the underside 348 of the base plate 323, as shown in Figs. 15, 34, and 35.

A lower, front corner portion of the projecting portion 369 is removed to form a recess 375 having side walls 376, 377, an upper wall 378, Fig. 35, and a curved front wall 379, for reasons as will presently appear. The central rib 364, which is positioned between the pair of side ribs 352, 353, terminates in a flanged portion similar to that just-described for the ribs 363, so that there is formed a recess 381, a portion 383 which is projected beyond the edge 354 of the base plate 323, and a locking recess 379 in the lower rear corner of the projecting portion 383.

The sectional guard plate 324, Figs. 16 and 31, comprises a guard section 384, which is substantially one-half the width of the base-plate member 323 and which extends between the center-line of one tuyère chamber 7 and the center-line of an adjacent retort chamber 8. The sectional guard plate 324 also comprises a guard section 385 which extends between the center-line of said retort chamber 8 and the center-line of the next adjacent tuyère chamber 7. It is noted that the base-plate member 323 is of sufficient width to extend between the center-lines of said successive tuyère chambers 7, 7. Referring to the grate-guard section 384, Figs. 15, 16, and 37 to 40, inclusive, a pair of ribs 386 and 387 extend downwardly from an underside 388 of a horizontal wall 325' of the guard section 384, so as to engage the supporting portions 355 and 357 of the base-plate member 323. The spacing of the ribs 386 and 387 is such as to permit the pair of ribs 349 and 351 to just fit therebetween, thereby preventing a cross movement of the grate-guard section 384 relative to the supporting base-plate member 323. The side ribs 386 and 387 may be spaced slightly inwardly of longitudinal side edges 389 and 391 of the grate-guard section 384, as shown in Fig. 16.

An upper, front corner portion of the horizontal wall 325' is offset, as shown in Figs. 15 and 40, to provide a recess 392 adapted to receive the overhanging or rearwardly projecting rib portion 335 of the base-plate member 323. Such construction prevents the tilting upwardly of the front end portion of the grate-guard section 384. A rearward movement of the grate-guard section 384 relative to its supporting base-plate member 323 may be normally prevented by means of a locking key 393, of which Fig. 36 is a perspective view. The locking key 393 is normally supported in the recess 371 formed in the rear end portion of the base-plate member 323 and it extends upwardly into an opening 394 in the horizontal wall 325' through which it may be removed when desired.

An upward movement of the rear end portion of the grate-guard section 384 is normally prevented by means of a pair of spaced lugs 395 and 396 which are adapted to fit in the recess 375 between the side walls 376 and 377 thereof. Each of these lugs, which extend forwardly from an inner side 397 and a rear depending wall 327' of the guard section 384, is provided with an upper horizontal portion 398, which abuts against the upper wall portion 378 of the recess 375, and a front portion 399 which abuts against the complementary base-plate portion 379.

A second pair of lugs 400 and 401 extend forwardly from the inner side 397 of the wall 327' and are provided with vertical edge portions 402 which abut against edge portions 403 and 404 of the rear base-plate edge 354, as shown in Figs. 15 and 32. Lower horizontal edges 405 of the lugs 400 and 401, as well as lower edges 406 of the central pair of lugs 395 and 396, are positioned in a common, substantially horizontal plane which is disposed in spaced relation to a lower edge 407 of the front wall 327', forming a shoulder 408 for reasons as will presently appear. The grate-guard section 384 may be further reinforced by means of a depending central rib 409 which extends from the front end of the top wall 325' to an enlarged wall portion 411 positioned to surround the key aperture 394, as shown in Figs. 39 and 40.

The other grate-guard section 385 of the guard structure 322, which is associated with the base-plate member 323, is formed in all respects similar to the grate-guard section 384 just-described. For example, it is similarly provided with supporting ribs 412 and 413, Fig. 16, which co-act with the ribs 352 and 353 to prevent a cross movement relative to the base-plate member 323.

The lower edge 407 of each of the front walls 327' of the grate-guard sections is in spaced relation to the top edge of the upper intermediate grate blocks 201, permitting the mounting therebetween of a rear wall 414 of the upper grate-block caps 202. The width of each of the grate-block caps 202 is substantially equal to that of the intermediate grate blocks 201 and they are so positioned as to constitute continuations of the vertical rows of grate blocks 201 that extend upwardly from the lower grate block 199. Thus, the width of the grate-block cap 202 is such that there are two for each of the sections 384, 385 of the grate-guard structure 322, as illustrated in Fig. 31. Each of the grate-block caps 202 comprises, in addition to the flat rear wall 414, a pair of forwardly extending side walls 415 and 416, as shown in the perspective views of Figs. 23 and 24.

A lower edge 417 of the rear wall 414, Fig. 15, is mounted on an adjacent upper edge of the intermediate grate-block 201, and slightly overhangs the adjacent, exposed face portion 216 thereof, as in the case of the intermediate grate-blocks 201. Edges 418 of the side walls 415, 416 are similarly mounted on upper edges of the grate-block side walls 214, 215, respectively. Each of the side walls 415, 416 is provided with a pair of spaced projecting lugs 419 and 421, of which the lug 419, immediately adjacent to the rear wall 414, is the shorter. These lugs extend beyond the edges 418 of the side walls 415, 416 and abut against the inner, upper side portions of the adjacent side walls 214, 215 of the intermediate grate-block 201. In this manner, transverse movement of the grate-block cap 202 relative to the lower, supporting grate-block 201 is prevented. The rear pair of locking lugs 419 are relatively shorter than the front pair of locking lugs 421 in order to decrease the upward tilting movement necessary in order to clear the lugs 419 of the rear wall 213 of the supporting grate-block 201.

Each of the side walls 415, 416 is provided with an angled rib 422 which abuts against the adjacent rib of the next grate-block cap 202, thereby forming therebetween an air passage. The inclination of the rib is such that air may be deflected outwardly and upwardly, as in the case of the lower air passages 223. Air may be supplied to the passages formed by the ribs 422, by reason of the presence of air-outlet openings 423 in front portions of the side walls 415, 416. A front side of the rear wall 414 is provided with a plurality of forwardly-extending tapered ribs 424, corresponding to the radiating ribs 225 of the lower grate-blocks.

An upper horizontal wall 425 of each of the grate-block caps 202 is positioned just below the lower edge 407 of an adjacent grate-guard front wall 327', and it extends forwardly to an upstanding cross-flange 426. The flange 426, Figs. 23 and 24, extends across the full width of the rear wall 414 and slightly beyond the same at each side to provide overhanging shoulder portions, outer sides 427 and 428 of which are positioned respectively in the plane of the outer side of the air-deflecting ribs 422.

A rear side 429 of the upright cross-flange 426 is positioned immediately adjacent to the front side portion 408 of the grate-guard section front wall 327' thereby preventing a rearward movement of the cap 202. An upper horizontal edge 431 of the cross-flange 426 is positioned in abutting relation to edges 405 and 406 of the spaced locking lugs 400—401 and 395—396, respectively, thereby preventing an undesirable upward movement of the grate-block cap 202. The top wall of the grate-block cap 202 may be further extended forwardly and downwardly by means of a curved portion 432, opposite edges of which are positioned in substantial alignment with the opposite edges 427 of the upright flange 426. These edge portions abut against the adjacent edge portions of successive grate caps 202, forming air chambers between successive pairs of side walls 415 and 416 having a rear outlet only into the ash pocket 5. A central lower edge portion of the curved wall 432 may be recessed as shown in Fig. 23.

Assuming, for example, that it is desired to replace the lower, supporting grate-block 199 in the vertical row shown in Fig. 15, the locking key associated with the grate-guard section 384 is first removed. This permits the removal of the grate-guard section 384, since upon a rearward movement, disengaging the locking rib 335 from the recess 392 and the center pair of locking lugs 395, 396 from the recess 375, the grate-guard section 384 may be lifted vertically clear of the supporting base-plate member 323. The grate-guard section 384, which prevents the rearward and upward movement of the grate-block cap 202, having been removed, the latter may be lifted vertically, disengaging the pairs of lugs 419, 421 from the adjacent intermediate grate-block 201 and then rearwardly away from the lower grate structure.

Should it not be desirable to remove entirely the grate-guard section 384, the latter is lifted just sufficiently to permit the locking cross-flange 426 to clear the adjacent lower edge 407 of the grate-guard front wall 327', whereupon the cap 202 is tilted slightly until the front pair of lugs 419 are above the adjacent upper edge of the rear wall of the supporting grate-block 201. The cap 202 is then moved upwardly and rearwardly from the grate structure. The remaining intermediate grate-blocks 201 may be detached from the supporting lugs on the grate-plate frames by moving the same vertically until the lugs are detached and then rearwardly. When the lower, supporting grate-block 199 is reached, it may be removed in a similar manner and then replaced by a new grate block. The parts may be again replaced in the reverse order of their removal.

Referring to Figs. 2, 3, 5, 30 to 32, inclusive, and 44 to 64, inclusive, each of the movable extension-grate sections 9, which are disposed in side-by-side relation across the width of the stoker, comprises a pair of spaced, upright side plates 433 and 434; upper, intermediate and lower grate-bar supports or tie members 435, 436, and 437; and a plurality of sectional-grate bars 438, which are supported on the movable grate frame formed by the side walls 433 and 434, and the bar supports 435, 436, and 437. Each grate bar 438 comprises an upper section 439 and a lower section 441.

Considering the movable grate frame in greater detail, as shown in Figs. 16, 30, 31, 32, 44, and 45, the side walls 433 and 434 are respectively provided with elongated, lower supporting edges 442 and 443 which slidably engage the upper sides of the horizontal wall portions of the grate-guard sections 384 and 385. Since these horizontal wall portions are relatively short as compared with the length of the side walls 433 and 434, additional bearing surfaces 444 and 445 are provided by elongated guiding members 446 and 447 respectively. Figs. 41, 42, and 43 are detail plan, side and end views of the guiding member 446. Rear end portions 448 and 449 of the members 446 and 447 are respectively provided with transverse flange portions 451 which extend toward the center line of the base plate 323, as shown, particularly, in Fig. 32. The end portions 448 and 449 are adapted to be mounted on the upper side of the front corner portions of the base plate 323 and are secured thereto by bolts or other fastening means.

Opposite end portions 453 and 454 of the members 446 and 447 are similarly provided with transversely extending portions 455 and 456 which are respectively bolted on bracket members 457 and 458 mounted on the tuyère sides of successive pairs of steel beams 14, 14. The side plates 433 and 434 may be guided during the normal reciprocatory movement thereof over the bearing portions 444 and 445 by pairs of upstanding flange portions 459 and 461, respectively, as shown, for example, in Figs. 16, 30, and 32.

The upper grate-bar support or tie member 9 as a whole is shown in connection with the extension-grate structure in Figs. 30 and 31 and in detail in Figs. 46 to 48, inclusive. As therein shown, the grate-bar support 435 is provided with a recess 462 in its upper side which extends the full length thereof. Upper horizontal edge portions 463 of the side walls 433 and 434 are similarly provided with recesses 464 which are disposed in alignment with the recess 462 in the grate-bar support 435. Front walls 465 of the recesses 462 and 464 are preferably vertical and constitute an abutment for a depending front wall 466 of each of the upper grate-bar sections 439, thereby preventing an undesirable forward movement of the latter. Rear walls 467 of these recesses are preferably inclined rearwardly and upwardly complementary to a rear side portion 468 of the front end wall 466.

The tie-bar recess 462 is further provided with a plurality of transverse openings 469 in the rear wall 467, forming a plurality of locking lugs 471 and 472. Each of the locking lugs 471 is adapted to extend between upper, horizontal side wall portions 473 and 474, Fig. 57, of the grate-bar section 439. The end lugs 472 are relatively short as compared with the intermediate locking lugs 471 by reason of the fact that the side plates 434 and 433 are respectively disposed between the side-wall portions 473 and 474 of the end grate-bar sections 439, as shown in Figs. 30 and 31. The opposite ends of the grate-bar support 435, just described, may be bolted to the side walls 433 and 434.

The intermediate grate-bar support 436 is shown in Figs. 30 and 31 associated with the extension-grate structure 9 and in detail in Figs. 49 to 51, inclusive. This member comprises a substantially horizontal upper wall 475 upon which rest upper front portions 476 and 477 of side walls 478 and 479, respectively, of the lower grate-bar section 441, Fig. 63. A rear edge 481 of the upper horizontal wall 475 is provided with a plurality of recesses 482 adapted to receive vertical shoulder portions 483 and 484 of the side walls 478 and 479. Each of the recesses 482 receives one of the vertical edge portions 483, 484 of one lower grate-bar section 441 and the opposite vertical shoulder portion of the next adjacent grate-bar section. Thus undesirable lateral movement of the upper end portion of the lower grate-bar sections 441 is prevented.

The supporting tie-bar 436 is further provided with a plurality of intermediate recesses 485 and end recesses 486 which extend across the width of the supporting bar 436, as shown in Fig. 30. A front side of each of these recesses is adapted to receive a substantially horizontal shoulder portion 487 of a locking lug or tongue 488 that extends downwardly and rearwardly from the lower end of the upper grate-bar section 439. A vertical movement of the lower end of each of the upper grate-bar sections 439 is prevented in this manner.

The upper front end of each of the lower grate-bar sections 441 is provided with a locking tongue or shoulder 489, which extends into the recess 485 from the rear side thereof, as shown in Fig. 30, thereby preventing a vertical movement of the upper end of the grate-bar section 441. The end recesses 486 function in the same manner as the intermediate recesses 485, but these recesses depend on the upright side walls 433 and 434 for one wall thereof. The opposite ends of the supporting bar 436 may be secured to the side walls 433 and 434 by bolts.

Referring to Figs. 30, 31 and 52 to 54, inclusive, the lower grate-bar support 437 comprises a vertical wall 491, a lower edge 492 of which abuts directly against the upper exposed surface of the horizontal grate guard wall 325 and is provided with a groove 493 forming scraping edges 494 and 495, as illustrated particularly in Figs. 30 and 54. The scraping edges 494 and 495 serve to remove the ashes from the portion of the grate guard wall 325 directly in the path of the moving extension grate 9. Thus the tendency for ashes to sift between the grate guard 322 and the movable extension grate is very greatly decreased. The vertical wall 491 is provided with an upper horizontal flange or wall portion 496, an upper side 497 of which is adapted to provide a supporting surface for horizontal edge portions 498 and 499, Fig. 63, of the side walls 478 and 479, respectively, of each lower grate section 441.

A rear edge 501 of the horizontal wall portion 497 is curved, as shown in Fig. 30. A plurality of pairs of spaced supporting ribs 502 extend rearwardly from the innerside of the horizontal wall 496 and the rear side of the vertical wall 491 and are further supported on the horizontal wall 325 of the grate-guard structure 322. The pairs of ribs 502 are spaced across the width of the wall 491, as shown in Fig. 53, there being one pair of ribs 502 for each lower grate-bar section 441. Each of the pairs of ribs 502 is spaced to receive a locking lug 503 that extends forwardly from an innerside 504 of a lower, imperforate, curved wall portion 505 of the grate-bar section 441. In this manner, vertical movement of the lower end portion of the grate section is normally prevented. The portion of the upper wall 497 between each pair of ribs 502 is provided with an air opening 506, as shown in Fig. 52.

The end portions of the vertical and horizontal walls 491 and 497 are respectively extended beyond the side walls 433 and 434 of the movable grate sturucture 9, and are adapted to fit recessed lower corner portions 507 in each of the side walls 433, 434. The vertical wall 491 is extended forwardly between the side walls 433 and 434 by means of an open framework 508. The respective ends of the framework 508 are provided with upwardly extending flanges 509 which are respectively bolted to the side walls 433 and 434. The framework 508 is provided with a plurality of air openings 510, as shown in Fig. 52.

Considering the upper grate bar section 439 in greater detail, as shown in Figs. 30, 31 and 55 to 60, inclusive, a plurality of overlapping plate sections 511 are mounted upon downwardly and rearwardly inclined portions 512 and 513 of side walls 514 and 515, respectively. The overlapping plate sections 511 are disposed in spaced relation to form a plurality of downwardly and rearwardly extending air-outlet passages 516. The walls of each passage 516 adjacent to a front end 517 thereof are oppositely inclined to increase the spacing therebetween, so that each of the air-outlet passages 516 is of tapered cross section throughout at least a portion of its length. Rear end portions 518 of each of the sections are enlarged, as shown in Fig. 30, to provide an inclined grate surface 519 which is exposed directly to the furnace heat. The grate surface 519 extends across the width of the grate section. A lower edge 521 of one enlarged portion 518 is spaced from an upper edge 522 of the next adjacent enlarged portion 518 to provide a cross recess 523. The side 522 of each of the recesses 523 is so curved that air as it passes from the passage 516 is deflected upwardly at an angle substantially transverse to that of the inclined grate surface formed by the end surfaces 519. As shown in Fig. 55, the cross recess 523 extends into the inclined portions 512 and 513 of the side walls 514 and 515, respectively.

In accordance with my invention, the upper grate-bar section 439 is reinforced against warping by means of a central rib 524 which extends upwardly from the lower depending tongue 488 to one of the locking lugs 471 formed on the upper grate-bar support 435. The central rib 524 has a portion 525 positioned just in front of the ends of the overlapping sections 511, as illustrated in Fig. 30. The elongated central rib 524 is provided with a plurality of rib portions 526 which extend into each of the air passages 516, dividing same into two passages 527 and 528, as shown in Fig. 31. The rear end portion of each of the ribs 526 is provided with transversely extending portions 529 and 531, in Fig. 57, forming a rear wall, the outer side of which is in substantial alignment with the end wall 521 of the enlarged portions 518. The air passages 527 and 528 may be interconnected by means of an opening 532 formed in an intermediate portion of the rib 526.

The exposed grate surface at the upper end of the grate-bar section 439, is formed in part by an inclined wall portion 533 which overlaps an adjacent section 534 to form an air passage 535 having an inclined upper side 536. The passage 535 is somewhat similar to the air passages 516, though shorter. The grate surface just mentioned further comprises a horizontal portion 537 constituting the upper side of a horizontal wall portion 538 that extends forwardly to the depending front wall 466. Each of the wall portions 533 and 538 extend across the full width of the grate-bar as in the case of the overlapping sections 511.

The lower edges of the side walls 514 and 515 respectively comprise the inclined portions 512 and 513, upper horizontal portions 539 and 541 and lower horizontal portions 542 and 543. The upper, horizontal edge portions 539 and 541 are respectively supported in the transverse recesses 469, Fig. 46, on opposite sides of one of the locking lugs 471. The lower, horizontal edge portions 542 and 543 of the side walls 514, 515 are supported on an upper, horizontal side portion 544 of a section 545 that is mounted on side walls 546 and 547 of the lower grate-bar section 441.

As shown in Figs. 31, 44, and 57, the inclined edge portion 512 of the side wall 514, which abuts against the outer side of a rear, inclined edge portion 548 of the side plate 434, is supported in this position by a pair of spaced outwardly extending lugs 549 and 551 of cylindrical form. The side wall portion 513 of the upper grate section that overhangs the opposite supporting plate 433 is similarly supported in position by a pair of lugs 552 and 553. The advantage of using the cylindrical lugs 549 and 551 is that a relatively small amount of material is necessary to be removed therefrom in order to provide the desired supporting points.

When it is necessary to remove one of the grate-bar sections 439, the upper end thereof is raised vertically in order to remove the same out of locking relation with the lug 471. The grate-bar section 439 is then moved forwardly as a whole to disengage the locking shoulder portion 487 of the tongue 488 from the recess 495, whereupon the grate-bar section may be lifted from the extension-grate structure 9. It is noted that the removal of the upper grate-bar sections 439 occurs independently of the lower grate-bar sections 441, so that a minimum disturbance of the adjacent parts of the stoker is required. Moreover, it is not necessary to remove or replace any bolts or rivets, since the upper grate-bar section 439 is secured in position entirely by locking lugs.

Referring to the lower section 441 of each of the grate bars 438, as shown in Figs. 30, 31, 61, and 64, inclusive, a plurality of overlapping plate sections 554 are mounted on the downwardly and rearwardly inclined walls 546 and 547. The overlapping sections 554 are disposed in spaced relation, forming a plurality of downwardly and rearwardly extending air-outlet passages 555. The walls of each of the passages 555 adjacent to a front end thereof are so oppositely inclined as to increase the spacing therebetween, whereby a passage of tapered cross section throughout at least a portion of its length may be obtained. The upper plate section 554 is spaced from the top section 545 to form an air passage 556. Rear end portions 557 of the overlapping sections are enlarged to provide a grate surface having an inclined upper portion 558, which is substantially contiguous to the grate surface of the upper grate-bar section 439, and a curved portion 559 which merges into a curved surface 561 of the rear wall 505. The lower end portion of the curved surface 561 is substantially contiguous to the upper exposed surface of the rear grate-guard wall 327. The curving of the lower grate surface 559 of the extension grate structure 9, rather than the grate surface of the lower grate sections 13, results in a decrease in the tendency for the ashes to arch over the ash pocket 5, such clinkers as tend to arch across the ash pocket 5 being quickly crushed.

A lower edge 562 of each of the enlarged section portions is spaced from an upper edge 563 of the next adjacent enlarged portion to provide a recess 564 that extends across the full width of the grate-bar section 441. As shown in Fig. 31, the recess or opening formed between the upper pair of sections 545 and 554 are extended across a portion only of the width of the grate-bar section 441 and it is centrally divided to form two outlet openings 565 and 566. The lower side edge 562 of the cross recess 564 is so curved that the air as it passes from the grate structure is deflected at subtantially a right angle thereto.

A central reinforcing rib 567 extends upwardly from a lower front portion of the grate-bar section 441 just above the depending wall 505 to the locking lug 489. The central reinforcing rib 567 is provided with a plurality of rearwardly projecting rib portions 568 which extend into the air passages 555, dividing the same into two passages. Each rib portion is provided with an opening 569 through which air may pass from one side of the rib 567 to the other. A curved front side 571 of the imperforate wall 505 is provided with a plurality of spaced, longitudinal extending grooves 572 through which air may pass.

A rearward movement of the lower grate-bar section 441 is normally prevented by means of a locking pin 573, Figs. 30 and 64, which extends through openings in the bar section 545, the locking lug 489 and the top wall 475 of the intermediate grate-bar support 436. Should one of the lower grate-bar sections 441 become damaged or require replacement for any resaon, it is necessary only to remove the pin 573 and then move the grate-bar section 441 rearwardly. When the upper locking lug 489 is disengaged from the recess 485 and when the lower locking lug 483 is removed from beneath the portion of the wall 495 overhanging the vertical wall 491, then the lower grate-bar section 441 may be freely lifted vertically.

A tie bar 576 extends between the side walls 433 and 434 of the extension-grate section 9 and it is connected by means of a pusher rod 577 to the main actuating linkage 128. Each of the pusher rods 577 passes through a sealing plate 578 which extends across the stoker just below the removable nose portion of the extension plates 11 and 12, as shown in Fig. 2. The sealing plate structure 578 is extended downwardly between the beams 14, 14 to the front end of the lower-grate air passages 187, thereby entirely sealing off the extension-grate sections 9 and the lower-grate sections 13 from the windbox 139. As a result, the air passing up into the extension-grate sections 9 is caused to pass upwardly through the various air openings above described into the material passing over the grate surface thereof.

A deflecting plate 579 is positioned between each pair of beams 14, 14 and it is extended downwardly and forwardly from the upper edge 161 of the front wall 132 of each of the lower-grate air chambers to the front edge of each pair of depending beam extensions 38, 38. Hence, siftings passing from the movable extension grates 9 are prevented from accumulating in the portions of the stoker just in front of the wall 132, and the deflected into a lower ash pocket 581.

While I have shown only one embodiment of my invention, for the purpose of describing the same and illustrating their principles of construction and operation, it is apparent that various changes and modifications may be made therein, without departing from the spirit of my invention, and I desire, therefore, that only such limitations shall be imposed thereon, as are indicated in the appended claims or as are demanded by the prior art.

I claim:

1. The combination with a stoker comprising a plurality of spaced beams, a plurality of extension grates carried by said beams and a plurality of lower extension grates secured to said beams, of a supporting structure, means for anchoring the beams at the front end to said structure to thereby immobilize the stoker at the front end with the structure, and means positioned below said extension grates and in front of said lower grates adapted to afford said stoker at the other end an anti-friction mounting on said structure.

2. A stoker comprising a plurality of beams forming retort and tuyère chambers, a plurality of movable extension grates carried by said beams, a plurality of lower grate sections secured to said beams, said extension grates and said lower grate sections being in substantial alignment with the retorts, a supporting structure, and means for immobilizing the stoker with the structure while permitting substantially free lengthwise expansion of said stoker under varying temperature conditions.

3. In an underfeed stoker, a support, a grate structure comprising a plurality of inclined beams fixed at their upper ends to said support, said beams being flat and forming the side walls of alternately arranged tuyère and retort chambers, a depending portion at the lower end of each of said beams, inclined upper and intermediate grate sections substantially co-extensive with the inclined length of the beams, a lower substantially vertical grate section supported at the lower ends of the beams and on said depending lower portions, and a bearing-support for the lower ends of said depending portions permitting substantially free longitudinal expansion and contraction of the latter.

4. In an underfeed stoker, a grate having alternately arranged tuyères and retorts, and a framework in which said tuyères and retorts are fixed and comprising a plurality of transversely spaced inclined stationary beams, a fixed supporting structure in which the upper ends of said beams are secured, means for uniting the lower ends of adjacent beams of the series to form spaced units each comprising a plurality of said beams, the spaces between said units constituting the said retort chambers, a bearing-support for each of said units permitting substantially free longitudinal expansion and contraction of the latter, means for preventing lateral displacement of the lower ends of said units, and a plurality of extension grate elements movably mounted in said framework and movable with the beams as the latter expand and contract.

5. In an underfeed stoker, a grate structure comprising a framework consisting of a plurality of flat inclined steel plates arranged in parallel vertical planes and constituting the walls of adjoining tuyère and retort chambers, said plates being secured at their tops in a supporting structure and at their bottoms being united in pairs forming independent units, the said retort chambers being formed between said units, a bearing support for the lower ends of said units permitting substantially free expansion and contraction of the latter, a plurality of tuyère elements supported on said plates and bridging the tops of the individual units, and a lower grate suspended at the lower end of said framework and movable with the said units as the latter expand and contract.

6. A stoker comprising a plurality of beams positioned in side-by-side relation forming tuyère and retort chambers, a stationary grate adapted to constitute one side portion of an ash pocket and supported solely on said beams, a stoker-supporting structure, means for immobilizing the stoker with the structure, and a bearing support permitting substantially free lengthwise expansion of said stoker under varying temperature conditions.

7. A stoker comprising a plurality of beams forming tuyère and retort chambers, a movable extension grate carried solely by said beams, a lower grate adapted to constitute one side of an ash pocket and also carried solely by said beams, a stoker-supporting structure, means for immobilizing the stoker with the structure, and a bearing support permitting substantially free lengthwise expansion of said stoker under varying temperature conditions.

8. In a furnace, a stoker comprising a plurality of beams in substantially parallel spaced relation, said beams defining the sides of alternately arranged tuyère and retort chambers, means for rigidly anchoring said beams in the front wall of said furnace and for supporting the other ends of said beams to permit substantially free longitudinal expansion and contraction of the beams under variable temperature conditions, said anchoring means comprising upright pedestals having forwardly projecting base portions and reinforcing struts therefor, and brackets seated on said pedestals and secured to said beams, means for feeding fuel into the forward ends of said retort chambers, and a plurality of elements operative between said beams and in the bottoms of the retort chambers to underfeed the fuel in the retorts.

9. In a furnace, a stoker comprising a plurality of beams in substantially parallel spaced relation, said beams defining the sides of alternately arranged tuyère and retort chambers, means for rigidly anchoring said beams in the front wall of said furnace and for supporting the other ends of said beams to permit substantially free longitudinal expansion and contraction of the beams under variable temperature conditions, said anchoring means comprising upright pedestals having forwardly projecting base portions and reinforcing struts therefor, and brackets seated on said pedestals and secured to said beams, means for feeding fuel into the forward ends of said retort chambers, a plurality of elements operative between said beams and in the bottoms of the retort chambers to underfeed the fuel in the retorts, a plurality of extension grate elements movably supported on said beams, and means for actuating said elements.

10. In a furnace, a stoker comprising a plurality of substantially parallel spaced inclined beams defining the sides of a series of alternately arranged tuyère and retort chambers, means for anchoring the upper ends of said beams in a wall of said furnace, thereby immobilizing said beams, a plurality of tuyère elements mounted on said beams and bridging the tuyère chambers, a plurality of reciprocatory fuel-feeding elements supported by said beams in the bottoms of the retort chambers, and mechanism for actuating said elements to underfeed the fuel in the retorts, means for feeding fuel into the upper ends of said retorts and for compacting the fuel in the latter, an extension grate movably supported on said beams, a lower grate suspended from said beams, and a bearing support for the lower ends of said beams permitting substantially free expansion and contraction of the beams under variable temperature conditions.

11. In a furnace, a stoker comprising a plurality of substantially parallel spaced inclined beams defining the sides of a series of alternately arranged tuyère and retort chambers, means for anchoring the upper ends of said beams in a wall of said furnace, thereby immobilizing said beams, a plurality of tuyère elements mounted on said beams and bridging the tuyère chambers, a plurality of reciprocatory fuel-feeding elements supported by said beams in the bottoms of the retort chambers, and mechanism for actuating said elements to underfeed the fuel in the retorts, means for feeding fuel into the upper ends of said retorts and for compacting the fuel in the latter, an extension grate movably supported on the lower ends of said beams, mechanism for actuating said grate, and a bearing support for the lower ends of said beams permitting substantially free longitudinal expansion and contraction of the beams under variable temperature conditions.

12. In a furnace, a grate, means forming an air chamber below the grate, a wall forming a support for the grate and constituting a rear wall of said chamber, antifriction bearings interposed between said wall and the grate, and means operatively associated with said wall and grate for sealing the joint therebetween.

13. In a furnace, a grate, means forming an air chamber below the grate, a wall forming a support for the grate and constituting a rear wall of said chamber, antifriction bearings interposed between said wall and the grate, and a member carried by said grate and coactive with said wall to form a seal at the joint between the wall and said grate.

14. In a furnace, a grate having a depending portion, means forming an air chamber below the grate, a wall located adjacent said depending grate portion and forming a support for the grate, said wall constituting a rear wall of said chamber, anti-friction bearings interposed between said wall and the grate, and elements extending between the bottom of said depending grate structure and said wall and slidably associated with the latter to form a seal between said elements and the wall.

15. A stoker comprising a substantially rigid framework, means forming tuyère and retort chambers in said framework, means for introducing fuel into the forward ends of and for underfeeding the fuel in said retorts, overfeed grate means carried by said framework at the rear ends of said retorts, a fixed support structure for said framework, and means for immobilizing the framework with the structure, and a bearing support permitting substantially free lengthwise expansion of said framework under varying temperature conditions.

16. A stoker comprising a substantially rigid inclined framework, means forming tuyère and retort chambers in said framework, means for introducing fuel into the upper ends of and for underfeeding the fuel downwardly in said retorts, overfeed grate means carried by said framework below said retorts, a fixed support structure for said framework, means for immobilizing the upper end of said framework in the structure, and a bearing support for the lower end of said framework permitting substantially free expansion and contraction of the latter under varying temperature conditions.

17. In a furnace, a stoker comprising a plurality of beams in substantially parallel spaced relation, said beams defining the sides of alternately arranged tuyère and retort chambers, means for rigidly anchoring said beams in the front wall of said furnace and for supporting the other ends of said beams to permit substantially free longitudinal expansion and contraction of the beams under variable temperature conditions, said anchoring means comprising upright pedestals having forwardly projecting base portions and reinforcing struts therefor, and brackets seated on said pedestals and secured to said beams, means for feeding fuel into the forward ends of said retort chambers, and means for underfeeding the fuel in said retorts.

18. In a furnace, a stoker comprising a plurality of beams in substantially parallel spaced relation, said beams defining the sides of alternately arranged tuyère and retort chambers, means for rigidly anchoring said beams in the front wall of said furnace and for supporting the other ends of said beams to permit substantially free longitudinal expansion and contraction of the beams under variable temperature conditions, means for feeding fuel into the forward ends of said retort chambers, a plurality of elements operative between said beams and in the bottoms of the retort chambers to underfeed the fuel in the retorts, and structural means operatively associated with the said front wall for resisting the forces reacting on said wall from the operation of said fuel-feeding elements.

19. In a furnace, a stoker comprising a plurality of beams in substantially parallel spaced relation, said beams defining the sides of alternately arranged tuyère and retort chambers, means for rigidly anchoring said beams in the front wall of said furnace and for supporting the other ends of said beams to permit substantially free longitudinal expansion and contraction of the beams under variable temperature conditions, means for feeding fuel into the forward ends of said retort chambers, means for underfeeding the fuel in said retorts, and means for bracing said front wall against the forces reacting thereon from the operation of said underfeeding means.

20. A grate guard comprising a pair of angularly disposed walls, of which one is provided with an upper surface adapted to support a movable grate and another is provided with an outer rear surface directly exposed to the furnace heat, the lower surface of said first-mentioned wall being provided with a pair of spaced supporting ribs, and a front surface of said second-mentioned wall being provided with supporting and locking lugs, said first-mentioned wall having a recess adapted to receive a key and also a depressed, recessed end portion adapted to fit a locking shoulder preventing an upward vertical movement of said end portion.

21. A base member for a grate guard, comprising a wall provided with a pair of upwardly extending ribs adapted to co-act with a pair of ribs on said grate guard so as to prevent a relative transverse movement, said wall also having an upright front flange extending transversely of said ribs and provided with an overhanging portion constituting a locking shoulder, said wall having a rear projecting portion provided with a recess on its upper side adapted to receive a locking key, the end portion of said extension being recessed so as to form a locking shoulder.

22. A grate guard structure comprising in combination a base plate having an overhanging lip at one end projecting toward the other end of said plate and having at said other end a recess for reception of a locking pin, and an upper plate adapted to seat upon the base plate and having at one end an offset depending lip for engagement under the overhanging lip of said base plate, said upper plate having at the opposite end a depending flange for enclosing the said other end of the base plate and an aperture arranged for registration with said base plate recess for reception of said locking pin, and a lug on the inner face of said depending flange for engagement under the adjoining end of the base plate.

23. A grate guard structure comprising in combination a base plate, an upper plate adapted to seat on said base plate, cooperating elements at the ends of said plates interlocking to prevent relative movement of the plates in a direction normal to the planes thereof, said plates having registering openings, and a locking element fitting in said openings and retaining said plates in the interlocked relation.

24. A grate guard structure comprising in combination a base plate, an upper plate adapted to seat on said base plate, cooperating elements at the ends of said plates interlocking to prevent relative movement of the plates in a direction normal to the planes thereof and engageable by relative movement of the plates in the longitudinal direction, elements on said plates cooperating to prevent relative transverse movements of said plates, said plates having registering openings, and a locking element detachably fitted in said openings and preventing longitudinal movement of the plates releasing said interlocking elements.

25. A lower terminal grate structure for stoker furnaces comprising a plurality of upright partitions defining the sides of adjoining air chambers, each of said chambers having an air supply opening, a plurality of upright vanes intermediate each of said partitions dividing the respective chambers into a plurality of upright sections, said vanes being in air-deflecting relation to said openings, and a plurality of grate blocks detachably supported in superimposed relation between the adjoining partitions and vanes and forming a wall for the respective air chambers, said blocks constituting the effective grate surface.

26. A stoker having an ash pocket disposed at one end thereof, an extension grate, and a lower grate structure disposed beneath said extension grate and constituting at least a portion of one side of said ash pocket, said lower grate structure having one or more vertically disposed air chambers communicating with said extension grate, and a duct connecting the lower end of each of said chambers with a source of air supply, whereby a portion of the air entering said chambers passes upwardly therein in cooling relation with said lower grate structure and discharges to said extension grate in a highly preheated state.

27. A stoker having an ash pocket disposed at one end thereof, an extension grate, and a lower grate structure disposed beneath said extension grate, said lower grate comprising a framework having a series of vertically disposed air chambers therein communicating with said extension grate, and a series of grate blocks detachably mounted on said framework and constituting at least a portion of one side of said ash pocket, said grate blocks having means provided therein defining passages for draft air, and a series of cooling vanes, and means for supplying draft air to said extension grate and lower grate structure, said means comprising a duct connecting the lower end of each of said chambers with a source of air supply, and passages connecting said chambers with said extension grate, whereby a portion of the air entering said chambers passes upwardly therein in cooling relation with said grate blocks and discharges to said extension grate in a highly preheated state.

HERBERT E. PRESTON.